(12) United States Patent  
McNeish et al.

(10) Patent No.: US 8,794,968 B2  
(45) Date of Patent: Aug. 5, 2014

(54) LASER BACKRANGE AND MARKSMANSHIP APPARATUS AND METHOD

(75) Inventors: Allister McNeish, Austin, TX (US); Keith A. Kunz, Fredericksburg, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 953 days.

(21) Appl. No.: 12/395,653

(22) Filed: Feb. 28, 2009

(65) Prior Publication Data

US 2011/0183300 A1    Jul. 28, 2011

(51) Int. Cl.
*F41G 3/26* (2006.01)

(52) U.S. Cl.
CPC ........................ *F41G 3/26* (2013.01)
USPC .................. 434/22; 434/11; 434/19; 434/21

(58) Field of Classification Search
USPC ................. 434/11, 20, 22; 250/206.2; 42/111
See application file for complete search history.

(56) References Cited

U.S. PATENT DOCUMENTS

| | | | |
|---|---|---|---|
| 3,888,022 A * | 6/1975 | Pardes et al. | 434/20 |
| 5,788,500 A * | 8/1998 | Gerber | 434/22 |
| 6,283,756 B1 * | 9/2001 | Danckwerth et al. | 434/11 |
| 6,821,124 B2 * | 11/2004 | Healy et al. | 434/22 |
| 7,196,302 B2 * | 3/2007 | Ohtomo et al. | 250/206.2 |
| 2007/0137088 A1 * | 6/2007 | Peters et al. | 42/111 |

OTHER PUBLICATIONS

Radiation hard diamond laser beam profiler with sub nanosecond temporal resolution by J. Schein, K. M. Campbell, R. R. Prasad, R. Binder, and M. Krishnan Alameda Applied Sciences Corp., 2235 Polvorosa Avenue, Suite 230, San Leandro, California 94577 Received Mar. 30, 2001; accepted for publication Sep. 25, 2001.*
http://www.timetools.co.uk/atomic-clock/fw/gps-clock.htm (Dated Feb. 13, 2007).*
http://www.omron-ap.com/product_info/ZG/index.asp dated Jan. 26, 2007.*

* cited by examiner

*Primary Examiner* — Robert J Utama
*Assistant Examiner* — Randall N Crenwelge
(74) *Attorney, Agent, or Firm* — Locke Lord LLP; Daniel G. Nguyen

(57) ABSTRACT

Methods and systems are provided for making more accurate range and marksmanship determinations in laser-based military engagements. These methods and systems allow a shooter and a target in a laser engagement system to be paired with one another in a substantially unambiguous manner. Such pairing allows the lasers to be used at full power and is particularly well suited for clustered environments in which multiple combatants may be in close proximity to one another. The methods and systems are also particularly well suited for testing new or experimental weapon systems by virtue of the more accurate range and marksmanship estimates provided.

18 Claims, 20 Drawing Sheets

LASER BACKRANGE AND MARKSMANSHIP APPARATUS AND METHOD

CROSS REFERENCE TO RELATED APPLICATIONS

Not Applicable

STATEMENT ON FEDERALLY SPONSORED RESEARCH OR DEVELOPMENT

Not Applicable

TECHNICAL FIELD OF THE INVENTION

The disclosed embodiments relate generally to war games and military training exercises and, in particular, to systems and methods for more accurately determining range and marksmanship during such war games and military training exercises.

BACKGROUND OF THE INVENTION

Modern war games and military training exercises use simulated weapons fire instead of live fire due to the high cost of munitions and restrictions on live weapons. The weapons that are simulated may range from small arms carried by soldiers and combat personnel to large caliber artillery mounted on tanks and armored vehicles. In a typical engagement simulation system, an infrared laser beam is fired from a laser transmitter mounted on a weapon to simulate firing of the weapon towards a target. A laser receiver at the target detects the laser beam and automatically determines its effect, including any hits, misses, damage, and so forth. The laser typically produces a number of short duration pulses that encode information about the nature of the weapon being simulated.

FIG. 1A illustrates a military training exercise involving an example of an existing laser engagement system 100 commonly referred to as MILES (multiple integrated laser engagement system). In a typical engagement, a first combatant 102 acquires targeting information on a second combatant 104 by aiming a cannon or other weapon at the second combatant 104. The first combatant 102 then activates a co-collimated laser transmitter 106 to simulate direct fire at the second combatant 104. The laser transmitter 106 emits a coded burst of laser pulses 108 towards the second combatant 104 that encodes within its pattern of pulses the nature and capability of the weapon being simulated by the first combatant 102.

At the second combatant 104, a receiver 112 receives and analyzes the laser pulses 108 from the transmitter 106 to determine, among other things, a range or distance from the first combatant 102 in order to estimate the degree of damage or lethality. The receiver 112 may also estimate marksmanship from the laser pulse 108, which is a measure of how well the second combatant 104 was hit. The range and marksmanship estimates are then provided to a control system (not expressly shown) of the second combatant 104 to use to determine the damage suffered by the second combatant 104. These range and marksmanship estimates may also be transmitted to a command center (omitted here) for storage and subsequent analysis in some cases.

Although not expressly shown, the first combatant 102 may also have a receiver, and the second combatant 104 may also have a transmitter. In fact, the transmitter and the receiver are commonly co-located and may also be implemented as a single integrated unit.

As can be seen, it is important that the receiver 112 be able to determine range and marksmanship for the second combatant 104 as precisely as possible. Incorrect range estimates may cause a hit to be declared on the second combatant 104 even though he/she/it may have been too far away based on the capabilities of the particular weapon being fired. Conversely, a hit may be declared to be inconsequential based on an incorrect estimate when in actuality the opposite is true. Similarly, inaccurate marksmanship estimates may cause a hit to be declared on the wrong combatant where multiple combatants are in close proximity to one another. Moreover, even if a hit turned out to be correctly declared, the amount of damage caused by the hit may still be incorrectly assessed (e.g., fatal versus only slightly damaged) if the range and/or marksmanship estimates are too far off.

For most laser receivers, the range may be estimated from the signal strength of the received laser pulses. Generally, short range weapon system simulators emit low laser power, medium range systems emit medium power and long range systems, such as battle tank main guns, emit high laser power to simulate lethal engagements at longer ranges. Unfortunately, this emitted power technique has a number of drawbacks in direct fire, line-of-sight systems like MILES. For example, dust, debris, smoke, rain, snow, and other atmospheric obstructions may block or otherwise obscure the path of the laser pulses, resulting in the reception of a weak signal by the receiver, while well within lethal range, that results in a hit being scored as inconsequential when it should be scored as lethal. Increasing the laser power to penetrate the obscured atmosphere is not an option because at the laser wavelengths used, higher power results in a potential for optically damaging the retina of persons who view the beam directly or aided by binoculars or other optical sighting systems. In addition, scattering of the laser beam by dust and other particles in the atmosphere or from the exit aperture of the laser transmitter can cause combatants that are not being aimed at to receive sufficient laser light that they mistakenly declare a lethal hit. As a result, one simulated shot may "kill" multiple targets incorrectly. In other words, scattering has the effect of spreading the laser beam out such that the laser beam profile, which is the area impinged by the laser beam when viewed on a perpendicular plane (as shown in FIG. 1B), appears to diverge and become larger than it would otherwise be in clear air. The enlarged laser beam profile caused by scattering effectively expands the "zone of lethality," which is a smaller area 110 within the laser beam profile where the laser signal strength is deemed sufficiently strong to cause damage on a target. Such an expanded zone of lethality may have an adverse effect on the accuracy of the marksmanship determination.

The above drawbacks may become exacerbated in clustered environments where other combatants 114, 116, and 118 are in close proximity to the first and second combatants 102 and 104, as shown in FIG. 1. In such clustered environments, ambiguity often arises as to which combatant is shooting and which combatant is being shot. For the above reasons as well as other drawbacks, operational testing of new or experimental weapon systems are generally prohibited from being conducted with laser engagement systems such as MILES.

One effort to overcome the line-of-sight limitations associated with direct fire systems like MILES is to use GPS (global positioning system) to track the geo-positions of the combatants and to exchange messages by radio through a central control when simulating fire or determining engagement lethality. An example of a GPS-based geo-positioning system is OneTESS (One Tactical Engagement Simulation System) currently being developed by AT&T Government Solutions. However, while OneTESS and similar GPS-based geo-positioning systems bring the advantages of indirect fire simulation and may be able to effectively pair combatants in simple one-to-one and/or long range engagements, these systems presently lack adequate precision and bandwidth to unambiguously pair combatants where a large number of combatants are in a close range, clustered environment.

Accordingly, what is needed is a laser engagement system, and method therefor, that overcomes the deficits and shortcoming of existing and projected solutions to add unambiguous direct fire pairing to systems such as OneTESS and to potentially couple the solution with a laser wavelength choice that is not transmitted and focused on the retina by the human eye, providing greatly enhanced safety while allowing the laser transmitter to operate at high enough power to penetrate murky atmospheres.

SUMMARY OF THE INVENTION

Aspects of the invention are directed to methods and systems for obtaining more accurate range and marksmanship determinations in laser-based military war games and training engagements. These aspects allow a shooter and a target in a laser engagement system to be paired with one another in a substantially unambiguous manner. Such pairing allows the lasers to be used at full power and is particularly well suited for clustered environments in which multiple combatants may be in close proximity to one another. Aspects of the invention are also particularly well suited for testing new or experimental weapon systems by virtue of the more accurate range and marksmanship estimates provided.

In some aspects, the methods and systems use cooperative measurements of the flight time of a laser pulse to more accurately determine the backwards range, or "backrange," estimates. As an exemplary implementation, these aspects may employ GPS-disciplined oscillators to synchronize the clock signals of a laser transmitter and a receiver. The synchronized clock signals allow a timer at a receiver to be started at almost exactly the same moment that a laser pulse is fired from a transmitter. This precision lets the receiver very accurately measure the time it takes for the laser pulse to travel from the transmitter to the receiver. The flight time may then be converted to a distance or range estimate via standard mathematical techniques.

Other exemplary implementations of the cooperative backrange aspects of the invention may measure both the flight time from a rangefinder to a target mounted receiver, as well as the flight time from the target back to the rangefinder, in order to obtain a backrange estimate. Such two-way flight time measurement may be made by first transmitting a laser pulse from the rangefinder to the receiver on the target that starts a timer at the receiver. The timer is allowed to run while the reflection of the laser pulse is received back at the rangefinder. Another laser pulse from the rangefinder is thereafter transmitted to the receiver that stops the timer. The measured inter-pulse time, which includes the flight time of the initial laser pulse traveling back from the receiver and the flight time of the subsequent laser pulse traveling forward to the receiver, may then be converted to a range estimate via standard conversion techniques. In some implementations, a predefined delay time may be added between the reception of the reflected laser pulse and the transmission of the subsequent laser pulse to allow for any initialization time that may be needed by the rangefinder. The delay time may also help minimize the duty cycle of the rangefinder as well as allow for more precise control over the timing of the subsequent laser pulse.

In some aspects, the methods and systems may also use different laser beam profiles produced by the transmitter to more accurately determine marksmanship at the receiver. As an exemplary implementation, these aspects may employ multiple laser beams that each have different profiles, or a single laser beam that is capable of transmitting multiple different profiles. The different beam profiles allow a receiver to be illuminated by some beam components, but not others, such that only a receiver in the intended target position is impinged by every laser profile component or by a required number of laser profiles. Each laser profile may carry a different encoding scheme to allow the targets to distinguish the different laser profiles from one another. Marksmanship may thereafter be determined according to the number of laser profiles that impinge a given receiver. In this way, a partially missed receiver on the target or other receivers close by on other non-targeted platforms will not be properly illuminated by a sufficient number of beam profile components to declare a high marksmanship hit.

In general, in one aspect, the invention is directed to a system for making laser-based cooperative time of flight backrange measurements. The system comprises a transmitter operable to emit a laser pulse upon occurrence of a predefined trigger event for a given engagement. The system further comprises a receiver operable to detect the laser pulse from the transmitter, the receiver having a range counter therein and configured to start the range counter upon occurrence of a predefined start counter event and to stop the range counter upon occurrence of a predefined stop counter event. Whatever count is reached by the range counter upon occurrence of the predefined stop counter event may then be used to determine a backrange from the receiver to the transmitter for the given engagement. It should be noted that the start counter event may be the occurrence of a GPS synchronized clock pulse and the stop counter event may be the detection of a laser pulse. Conversely, the start counter event may be the detection of a laser pulse and the stop counter event may be the occurrence of a GPS synchronized clock pulse. Both are solutions that yield the backward range to the transmitter after mathematical manipulation of the counter value using standard techniques.

In general, in another aspect, the invention is directed to a method of making laser-based cooperative time of flight backrange measurements. The method comprises the steps of emitting a laser pulse from the transmitter of a laser rangefinder and detecting the emitted laser pulse at a receiver. The method further comprises the step of starting a range counter at the receiver upon occurrence of a predefined start counter event and stopping the range counter at the receiver upon occurrence of a predefined stop counter event. The method also comprises the step of sending a second laser pulse from the rangefinder upon the arrival back at the rangefinder of the first pulse or after a preset delay after the arrival of the first pulse and the subsequent detection of this second pulse at the receiver. The method finally comprises the step of using a count reached by the range counter upon occurrence of the predefined stop counter event to determine a backrange from the receiver to the transmitter for the given engagement.

In general, in yet another aspect, the invention is directed to a system for making laser-based marksmanship determinations. The system comprises a transmitter operable to emit a plurality of laser pulses for a given engagement, at least two of the laser pulses having laser beam profiles that span different but overlapping areas. The system further comprises a receiver operable to detect the plurality of laser pulses from the transmitter, the receiver configured to distinguish between laser pulses having different laser beam profiles. The number of different laser beam profiles received by the receiver for the given engagement may be then used to determine a marksmanship of the transmitter by determining how close to the receiver the transmitted pattern landed.

In general, in still another aspect, the invention is directed to a method of making laser-based marksmanship determinations. The method comprises the step of emitting a plurality of laser pulses from a transmitter for a given engagement, at least two of the laser pulses having laser beam profiles that span different but overlapping areas. The method further comprises the step of detecting the plurality of laser pulses from the transmitter at a receiver, the receiver configured to distinguish between laser pulses having different laser beam profiles. The method finally comprises the step of using the number of the different laser beam profiles received by the receiver for the given engagement to determine a marksmanship of the transmitter.

BRIEF DESCRIPTION OF THE DRAWINGS

The foregoing and other advantages of the invention will become apparent from the following detailed description and upon reference to the drawings, wherein.

DETAILED DESCRIPTION OF EXEMPLARY EMBODIMENTS

Figure 1A:
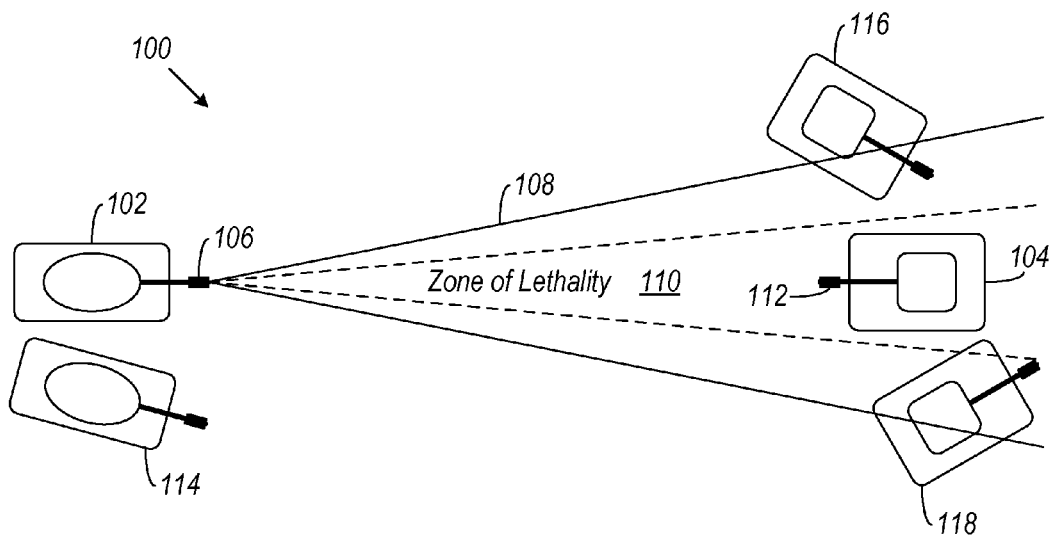
FIGS. 1A-1B illustrate a laser-based military engagement system and a laser beam profile, respectively, according to the prior art.
Figure 1B:
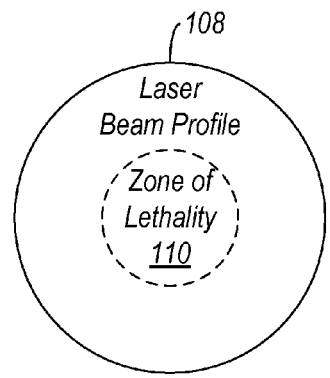

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computing instructions for use with or by the embodiments disclosed herein may be written in an object oriented programming language, conventional procedural programming language, or lower-level code, such as assembly language and/or microcode. The instructions may be executed entirely on a single processor and/or across multiple processors, as a stand-alone software package or as part of another software package. Such computing instructions may be provided to a stand-alone processor, a general-purpose computer, special-purpose computer, ASIC, field-programmable gate array (FPGA), and/or other programmable data processing system.

The executed instructions may create structures and functions for implementing the actions specified in the mentioned block diagrams and/or operational illustrations. The functions/actions/structures noted in the drawings may also occur out of the order noted in the block diagrams and/or operational illustrations. For example, two operations shown as occurring in succession, in fact, may be executed substantially concurrently or the operations may be executed in the reverse order, depending on the functionality/acts/structure involved.

As mentioned above, certain aspects of the invention employ cooperative time of flight measurements to more accurately determine backrange in laser-based military engagement systems. Other aspects of the invention rely on the use of multiple different laser beam profiles to more accurately determine marksmanship. The following description focuses first on the cooperative time of flight backrange aspects of the invention, as illustrated in FIGS. 1-13. Other aspects of the invention that pertain to the use of multiple laser beam profiles are then discussed with respect to FIGS. 14-19.

In general, cooperative time of flight backrange measurements allow a shooter and a target to be paired with one another in an unambiguous manner, even in crowded and clustered environments. The term "cooperative" is used herein to mean that the laser receiver is operating in concert or coordination with the laser transmitter, or rangefinder, as opposed to simply detecting a laser pulse from the rangefinder. The extent and type of concerted or coordinated action that exists between the rangefinder and the receiver may vary according to each implementation, such that there may be more concerted action in some cases and less in others. However, the presence of any amount of concerted or coordinated action is in stark contrast to existing solutions where the rangefinder and the receiver operate entirely independent of one another.

The cooperative time of flight backrange measurement aspects of the invention may be implemented in at least two ways.

As an example, cooperative time of flight backrange measurements may be made by measuring the flight time in not just one, but both directions between a rangefinder and a receiver. Such a bi-directional flight time measurement may be made by transmitting a laser pulse from the rangefinder to the receiver to start a timer at the receiver, then using the reflection from that laser pulse to trigger another laser pulse to the receiver that stops the timer. The combined flight times of the reflected laser pulse and the subsequent laser pulse, called the "inter-pulse time," may then be used to determine the distance between the rangefinder and the receiver. In some implementations, a predefined delay time may be added between the return of the initial laser pulse and the firing of the follow-up laser pulse to account for any initialization time that may be needed at the rangefinder. This delay time may also help reduce the duty cycle of the rangefinder while enabling more precise scheduling of the follow-up laser pulse.

In other implementations, highly accurate GPS satellite clock signals may be used to synchronize the clocks at the rangefinder and the receiver in order to make the cooperative backrange measurements. GPS satellites are known by those having ordinary skill in the art to generate very accurate time information in addition to geo-positioning information. The time information provided by the GPS satellites is referenced to a universal time constant (UTC) and may generally be acquired through GPS receivers. Various devices and applications may then synchronize their clocks to the GPS satellite clocks via the GPS receivers to ensure highly accurate timekeeping.

Figure 2:
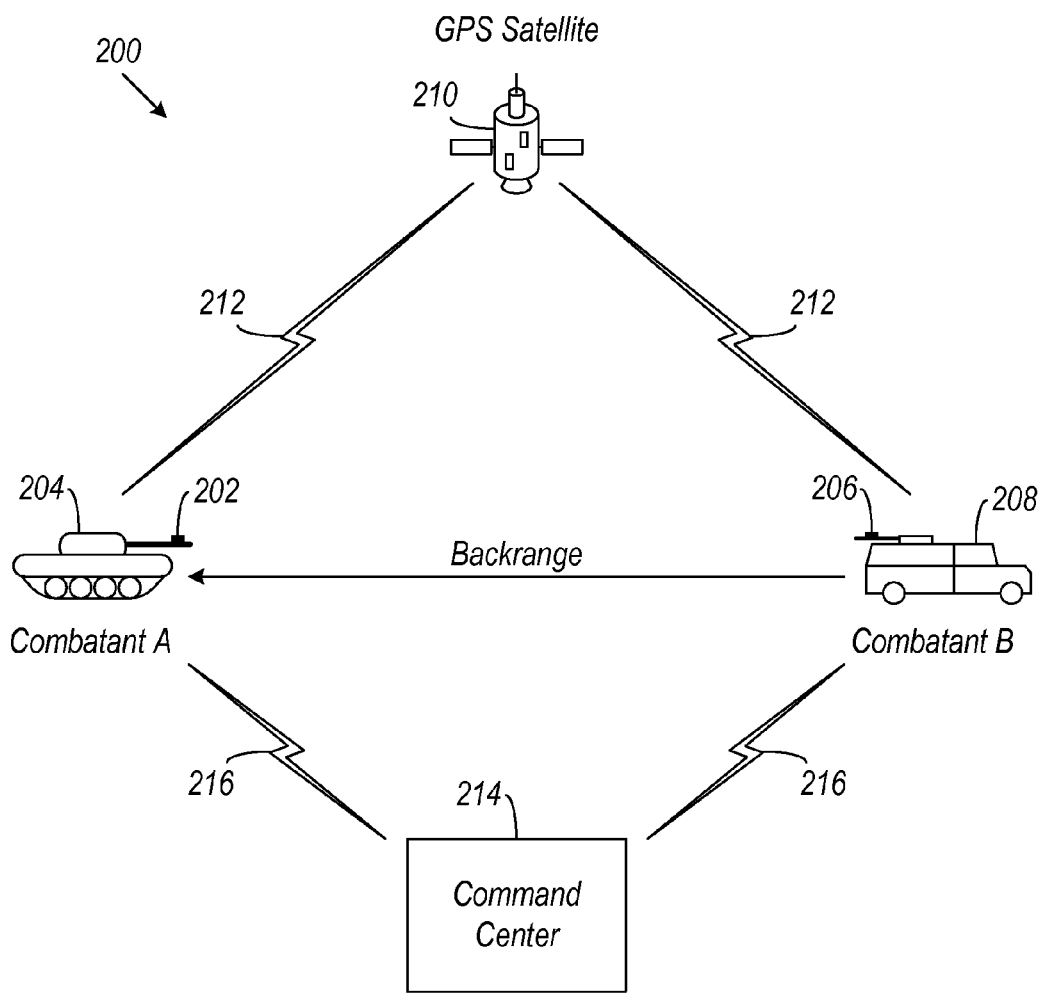
FIG. 2 illustrates a laser-based military engagement system that uses cooperative time of flight backrange measurements according to aspects of the invention.

A GPS-based implementation may be seen in FIG. 2 where a laser engagement system 200 is shown that uses GPS satellite time to make cooperative time of flight backrange measurements. As can be seen, the GPS-synchronized laser engagement system 200 comprises a GPS-based laser transmitter 202 mounted on a shooter 204 (Combatant A) and a GPS-based receiver 206 mounted on a target 208 (Combatant B). The GPS-based transmitter 202 and the GPS-based receiver 206 are configured to receive time information from a GPS satellite 210 via satellite transmissions 212. This GPS satellite time information may then be used to measure the flight time for a laser pulse arriving at the GPS-based receiver 206 from the GPS-based transmitter 202. In some implementations, the shooter 204 and the target 208 may additionally communicate measurements and other information to a command center 214 via wireless transmissions 216 for storage and analysis.

For economy of the description and also for clarity of the figure, only one shooter 204 having a GPS-based laser transmitter 202, one target 208 having a GPS-based receiver 206, and one GPS satellite 210 are shown in FIG. 2. It should be understood, however, that the GPS-synchronized laser engagement system 200 may comprise multiple GPS-based transmitters 202 and multiple GPS-based receivers 206, each of which may receive GPS time information from the same or different GPS satellites 210. Moreover, each shooter 204 and each target 208 may have both a GPS-based transmitter 202 and a GPS-based receiver 206, either as discrete units that may or may not be co-located, or as a single integrated unit, depending on the particular application. Finally, although the shooter 204 and the target 208 are depicted as military vehicles in FIG. 2, those having ordinary skill in the art will understand that one or more of these combatants may instead be an individual combat personnel. In the latter case, the GPS-based transmitter 202 and the GPS-based receiver 206 may be worn or otherwise carried by the combat personnel as appropriate.

Figure 3:
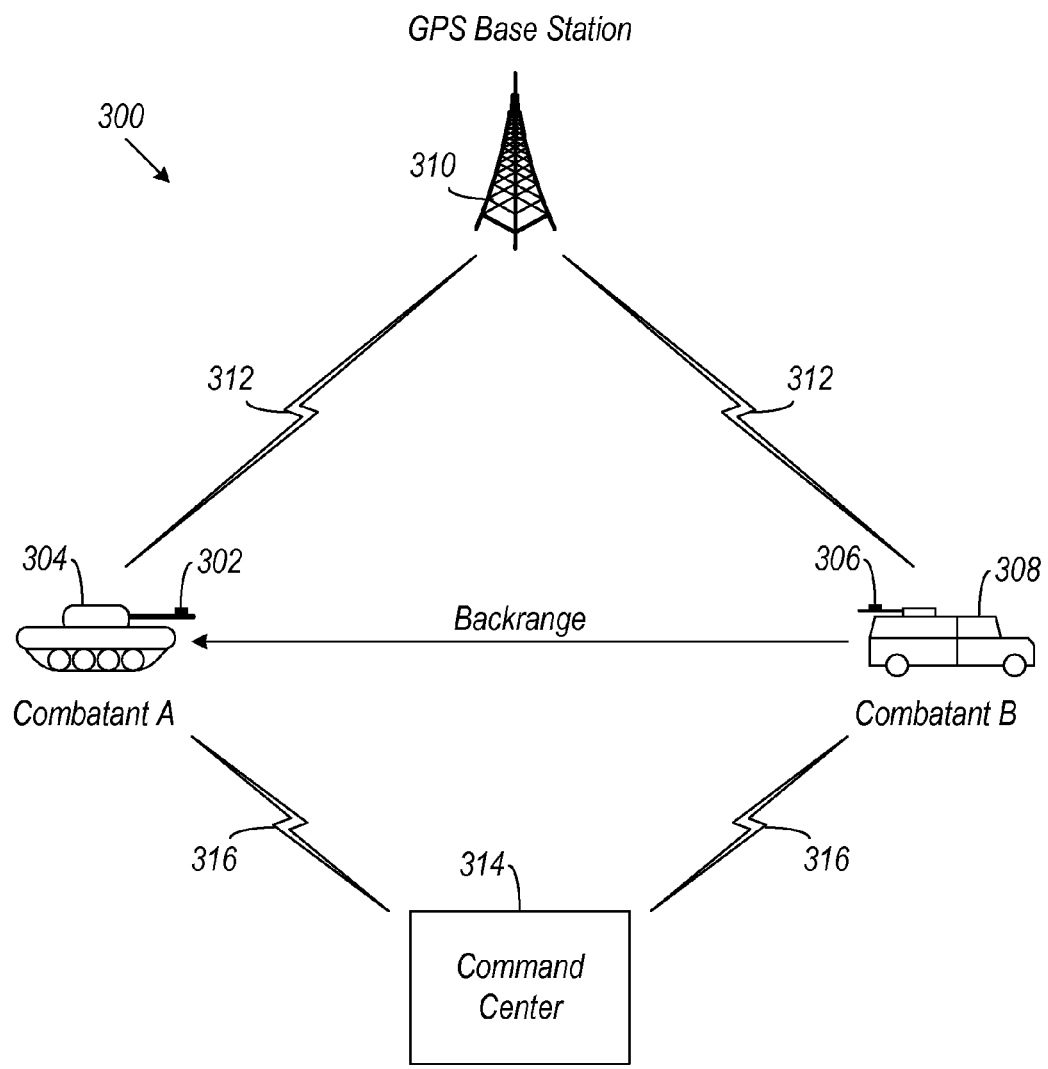
FIG. 3 illustrates another laser-based military engagement system that uses cooperative time of flight backrange measurements according to aspects of the invention.

FIG. 3 illustrates an alternative example of a GPS-synchronized laser engagement system 300 into which a GPS base station is used instead of GPS satellites. This GPS-synchronized laser engagement system 300 is similar to the GPS-synchronized laser engagement system 200 of FIG. 2 insofar as it comprises a GPS-based laser transmitter 302 mounted on a shooter 304, a GPS-based receiver 306 mounted on a target 308, and a command center 314 to which shooter and target information may be transferred via wireless transmissions 316. These components 302-314 are similar to their counterparts in FIG. 2 and are therefore not separately described herein. As can be seen, instead of a GPS satellite, a GPS base station 310 may be provided to transmit GPS time information to the GPS-based rangefinder 302 and the GPS-based receiver 306. Such a GPS base station 310 may function essentially as a transponder for the GPS satellite(s) and, owing to its closer proximity, may help minimize any drift that may develop between the GPS-based transmitter 302 and the GPS-based receiver 306.

Figure 4:
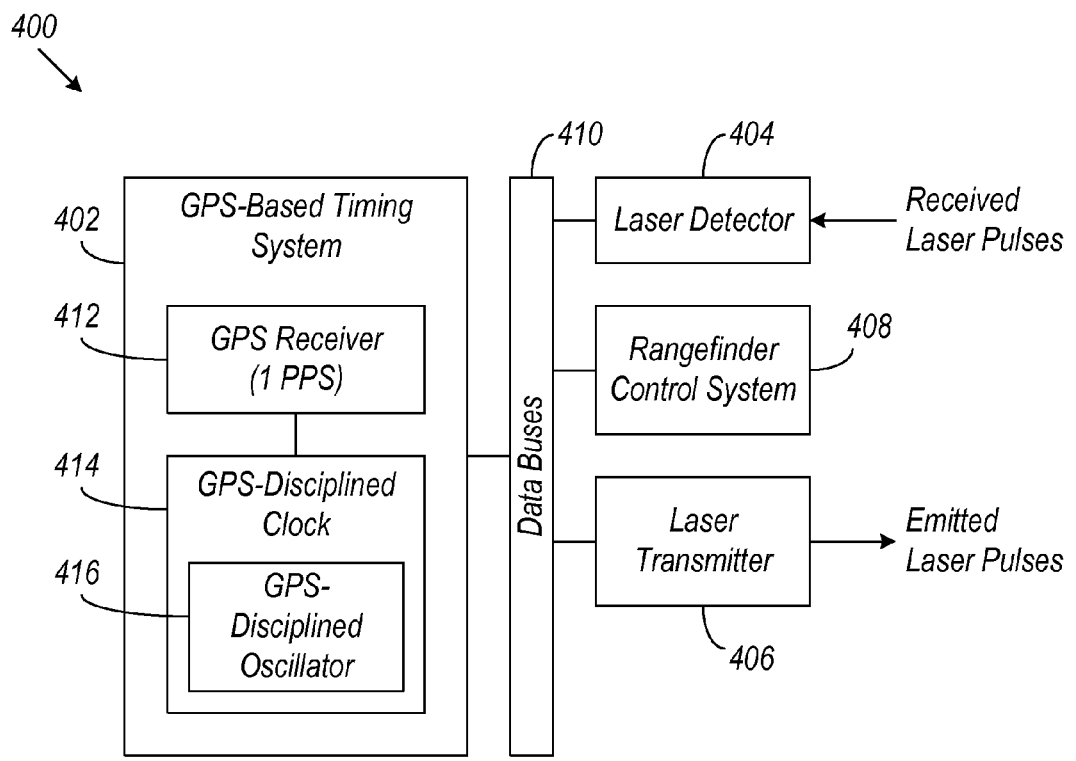
FIG. 4 illustrates a rangefinder that may be used for cooperative time of flight backrange measurements according to aspects of the invention.

Turning now to FIG. 4, a more detailed example is shown of a GPS-based rangefinder 400 according to aspects of the invention. In most respects, the GPS-based rangefinder 400 is similar to standard laser rangefinders that are commercially available from a number of manufacturers, including Bushnell Corporation of Overland Park, Kans., Goodrich Corporation of Charlotte, N.C., and Vectronix, Inc. of Leesburg, Va. Such laser rangefinders operate generally by firing a short laser pulse or pulses towards a target and measuring the time it takes for the laser pulse or pulses to reflect off the target and return to the rangefinders.

The GPS-based rangefinder 400 has an additional feature, however, in that the firing of the laser pulse is synchronized to a GPS receiver clock. GPS satellites are configured to generate clock pulses, one pulse per second (1 PPS), in GPS receivers, at almost exactly the same time (e.g., within 25 nanoseconds according to some sources) provided that the GPS receivers are substantially within the coverage of the same GPS satellite constellation. This means that GPS receivers "tick" substantially in unison regardless of where they are on or above the surface of the Earth. This "tick" may then be used to synchronize the timing of various events, such as the firing of a laser pulse or the starting of a timer. The fact that the "tick" for one event and the "tick" for another event may need to be derived from different GPS receivers has little or no effect on the synchronization due to the capability of the GPS satellite system in providing accurate time stamps to GPS receivers illuminated by substantially the same constellation of GPS satellites.

Synchronizing an event with a "tick" from a GPS receiver may be accomplished by referencing or disciplining an oscillator, such as a quartz crystal oscillator or other highly stable oscillator, to the clock "ticks" produced within the GPS receiver by the GPS satellite system. Techniques for creating GPS-disciplined oscillators are well known to those having ordinary skill in the art as evidenced by, for example, U.S. Pat. No. 5,440,313 ("GPS Synchronized Frequency/Time Source") and U.S. Pat. No. 5,717,404 ("GPS Reference Clock Generator"), which are incorporated herein by reference. In general, a GPS receiver may be used to obtain GPS timing information, including the 1 PPS "tick," from the GPS satellites and provide the information to a controller. The controller then compares the GPS timing information to the output of a voltage-controlled oscillator (VCO). Any difference between the frequency of the VCO output (which may need to be divided by an appropriate factor) and the GPS receiver is provided as a feedback signal to the VCO by the controller in order to adjust the VCO output.

In accordance with aspects of the invention, the GPS-based rangefinder 400 may be equipped with a GPS-disciplined oscillator that may be used to regulate the timing of laser pulses from the GPS-based rangefinder 400. This is shown in a FIG. 4, where the GPS-based rangefinder 400 can be seen to comprise a GPS-based timing system 402, a laser detector 404, a laser transmitter 406, and a rangefinder control system 408, among other functional components. One or more data buses 410 may be provided to connect the various functional components 402-408 together as needed. In general, the laser detector 404 functions to detect laser pulses received by the GPS-based rangefinder 400 (e.g., reflected laser pulses), the laser transmitter 406 functions to emit laser pulses, and the rangefinder control system 408 functions to control the operation of the laser detector 404 and the laser transmitter 406.

Firing of the laser pulses from the laser detector 404 may be regulated by the GPS-based timing system 402 via a trigger signal, which is essentially a clock signal, from the GPS-based timing system 402. To this end, the GPS-based timing system 402 may comprise a GPS receiver 412 and a GPS-disciplined clock 414, among other components. The GPS receiver 412 produces GPS clock "ticks" from the GPS satellite signals and provides the GPS clock "ticks" to the GPS-disciplined clock 414. The GPS-disciplined clock 414 may then use the GPS clock "ticks" to generate a clock signal. In one implementation, the GPS-disciplined clock 114 may generate the clock signal by using the GPS clock "ticks" to discipline an oscillator 416 in a manner known to those having ordinary skill in the art. The output of this GPS-disciplined oscillator 416, which may be a 1 MHz, 5 MHz, 10 MHz, 20 MHz, and so forth signal, may then be converted by the GPS-disciplined clock 414 into a clock signal having a desired frequency, such as 1 Hz, 5 Hz, 10 Hz, 20 Hz, and so forth. The waveforms that constitute the clock signal of the GPS-disciplined clock 414 may thereafter be provided to the laser transmitter 406 to control firing of the laser detector 404.

In general operation, when a shooter executes a firing sequence for the GPS-based rangefinder 400, a control signal is sent from the rangefinder control system 408 to the laser transmitter 406 to fire the laser transmitter 406. However, no laser pulse is actually fired by the laser transmitter 406 until the instant a clock signal is received from the GPS-disciplined clock 414. This clock signal may be in the form of a rising edge, a falling edge, a logic level, and the like, depending on the particular configuration of the laser transmitter 406. When the clock signal from the GPS-disciplined clock 414 is received, the laser transmitter 406 immediately fires a laser pulse, then waits for the next clock signal. Of course, if no control signal is received from the rangefinder control system 408, then no laser pulse is fired regardless of whether clock signals from the GPS-disciplined clock 414 continue to be received.

In a typical arrangement, the clock signal from the GPS-disciplined clock 414 may have a frequency of 10 Hz, resulting in 10 laser pulses being fired per second. In other arrangements, however, the laser transmitter 406 may be internally configured to fire not one, but a string of laser pulses at a time. For example, consider a case where the GPS-disciplined clock 414 generates a 1 Hz clock signal, but the laser transmitter 406 is a type that, once activated, will automatically fire a burst of laser pulses, say, 5 laser pulses, in rapid succession. In that case, it is contemplated that only the initial laser pulse, namely, the one that coincides with the receipt of a waveform (e.g., rising edge, falling edge, logic level, etc.) from the GPS-disciplined clock signal, need be used for the cooperative backrange measurement. The remaining laser pulses in the string of laser pulses may also be used if desired, or they may simply be ignored, depending on the particular application.

Figure 5:
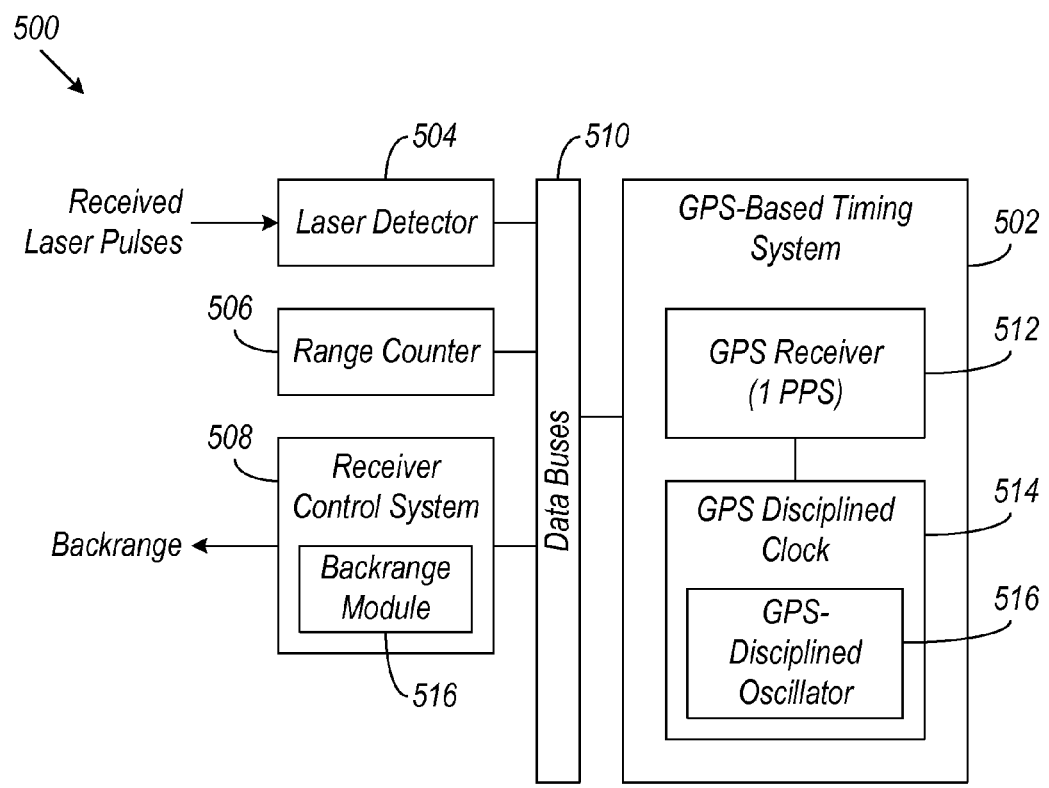
FIG. 5 illustrates a receiver that may be used for cooperative time of flight backrange measurements aspects of the invention.

On the target side, the laser pulse from the laser transmitter 406 is received by a GPS-based receiver 500, an example of which is illustrated in FIG. 5. Like the GPS-based rangefinder 400, the GPS-based receiver 500 is otherwise similar to commercially available laser receivers except it is equipped with a range counter that is synchronized to a GPS satellite clock. As can be seen, the GPS-based receiver 500 comprises a GPS-based timing system 502, a laser detector 504, a range counter 506, and a receiver control system 508, among other functional components. One or more data buses 510 may be provided to connect the various functional components 502-508 together as needed. In general, the laser detector 504 functions to detect laser pulses received by the GPS-based receiver 500, the range counter 506 functions as a high frequency (e.g., 10 MHz, and 20 MHz, 30 MHz, 40 MHz, etc.) timer to measure the flight time for one or more of the received laser pulses, and the receiver control system 508 functions to control operation of the laser detector 504 and the range counter 506.

In accordance with aspects of the invention, the range counter 506 may be initiated by a start signal in the form of a clock signal from the GPS-based timing system 502. To this end, the GPS-based timing system 502 may comprise a GPS receiver 512 and a GPS-disciplined clock 514, among other components. These GPS-based components are similar to their counterparts in the GPS-based timing system 402 of FIG. 4 and are therefore not discussed in detail here. Suffice it to say, the GPS-disciplined clock 514 may generate a clock signal using a GPS-disciplined oscillator 516 that is synchronized to a GPS satellite clock. The clock signal here may have the same frequency (e.g., 1 Hz, 5 Hz, 10 Hz, 20 Hz, etc.) as the clock signal from the GPS-disciplined clock 416 of FIG. 4. Moreover, the two clock signals may be almost perfectly in phase with one another (e.g., within 25 nanoseconds) by virtue of their GPS disciplined oscillators 416 and 516 being referenced to GPS satellite clocks.

The clock signal from the GPS-disciplined clock 514 may then be used to regulate the starting of the range counter 506 so that it coincides (e.g., within 25 nanoseconds) with the firing of the laser pulse from the laser transmitter 406. This means of course that the clock signal from the GPS-disciplined clock 514 should have the same frequency (e.g., 10 Hz) as the clock signal from the GPS-disciplined clock 414 of FIG. 4. To the extent any drift may develop between the two clock signals, such drift should be compensated each time the GPS-disciplined oscillators 416 and 516 are synchronized back to their respective GPS satellite clocks. This temporal alignment of the clock signals from the two GPS-disciplined clocks 414 and 514, combined with the high frequency of the range counter 506, produces a very precise measurement of the flight time for a given laser pulse arriving at the GPS-based receiver 500. The flight time may then be converted to an estimate of the backrange or distance from the target to the shooter in a manner known to those having ordinary skill in the art.

Flight time measurement may begin generally when the range counter 506 receives a waveform (e.g., rising edge, falling edge, logic level, etc.) from the clock signal of the GPS-disciplined clock 514. At that instant, the range counter 506 starts counting, for example, at a rate of 30 MHz, then stops counting when a laser pulse is received by the laser detector 504. When another clock signal waveform is received from the GPS-disciplined clock 514, the range counter 506 starts counting again until another laser pulse is received, and so on. Of course, if no laser pulse is received by the laser detector 504 by the time the next clock signal from the GPS-disciplined clock 514 is received, then the range counter 506 simply overflows into a restart.

Assuming there is not an overflow, whatever count the range counter 506 stops on when a laser pulse is received by the laser detector 504 may be read or otherwise captured by the receiver control system 508 and used as a measure of the flight time for the laser pulse. This count may then be converted to a backrange measurement by applying calculations well known to those having ordinary skill in the art, for example: backrange=count*speed of light/range counter frequency (the speed of light is denoted herein by the letter "c"). It may also be desirable in some cases to take a range counter reading for several laser pulses (e.g., 3, 5, 7, etc.) and use either the average count, median count, maximum count, minimum count, or some other mathematical and/or statistical variation to calculate the backrange measurement.

The foregoing backrange measurement process may be implemented in the receiver control system 508 in the form of a backrange module 516 for some aspects of the invention. This backrange module 516 may be a software module downloaded to and executed on the receiver control system 508, a hardware module fitted to or integrated with the receiver control system 508, or a combination of both software and hardware. The backrange module 516 may also be one of several smaller components making up a larger overall software program and/or hardware component on the receiver control system 508. In any event, such a backrange module 516 may then be operated to measure the backrange from the target to the shooter in the manner described above.

Figure 6:
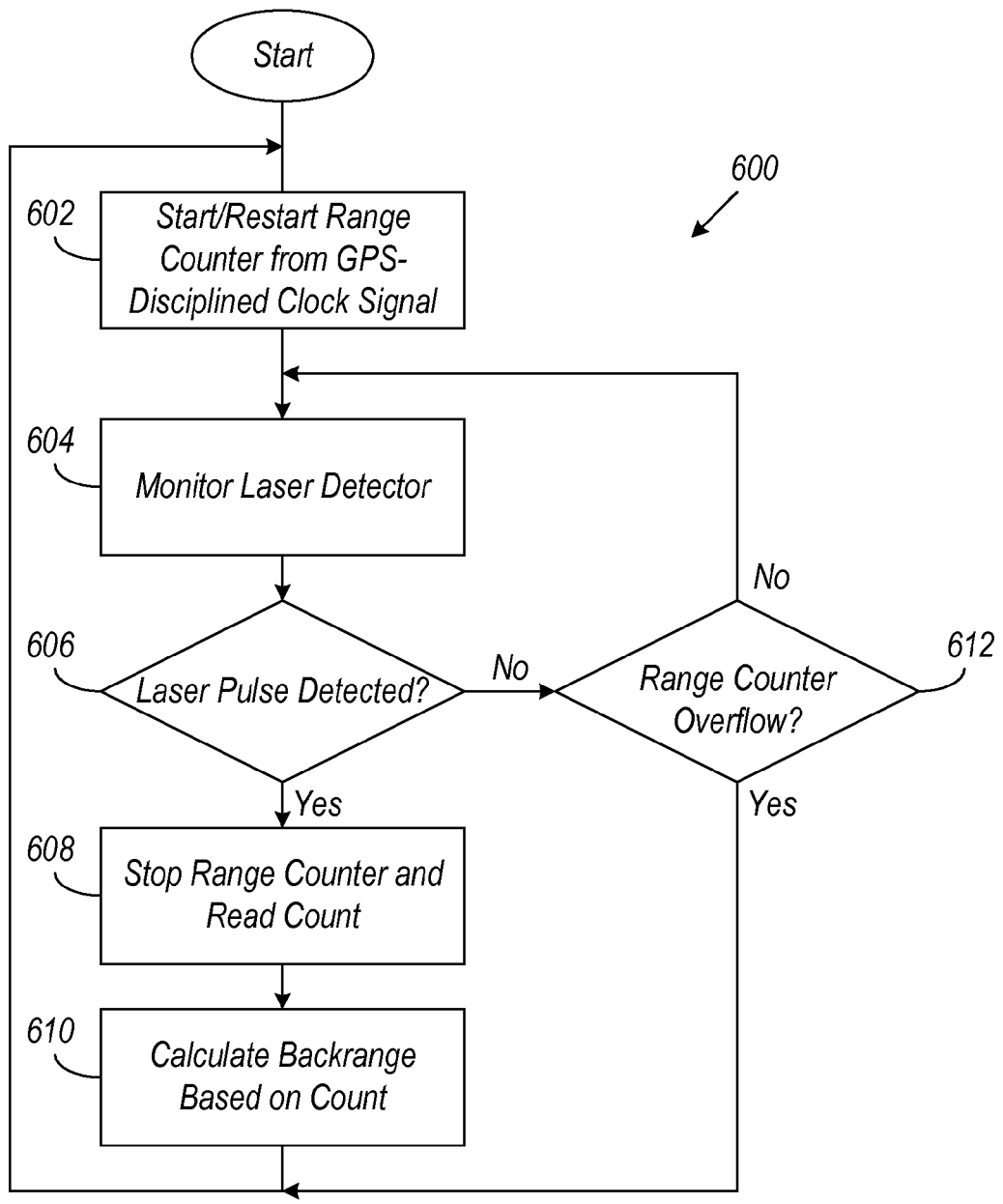
FIG. 6 illustrates a method that may be used for cooperative time of flight backrange measurements aspects of the invention.

General guidelines for operation of the backrange module 516 are illustrated in the form of a flowchart 600 in FIG. 6. As can be seen, the flowchart 600 begins at block 602 where the range counter 506 is started/restarted with a clock signal waveform from the GPS-disciplined clock 514. At block 604, the laser detector 504 is monitored for incoming laser pulses, and a determination is made at block 606 as to whether a laser pulse has been detected. If a laser pulse is detected, then at block 608, the range counter 506 is stopped and the count is read or otherwise captured. The count is thereafter used to calculate the backrange in a manner known to those having ordinary skill in the art at block 610. If no laser pulse is detected at block 606, then a determination is made at block 612 has to whether the range counter 506 has overflowed and restarted (i.e., meaning another GPS-disciplined clock signal waveform has been received). If there is no overflow, then the flowchart 600 returns to block 604 where the laser detector 602 is once again monitored. On the other hand, if there is an overflow, then the flowchart 600 returns to block 602 where the process is restarted.

Figure 7A:
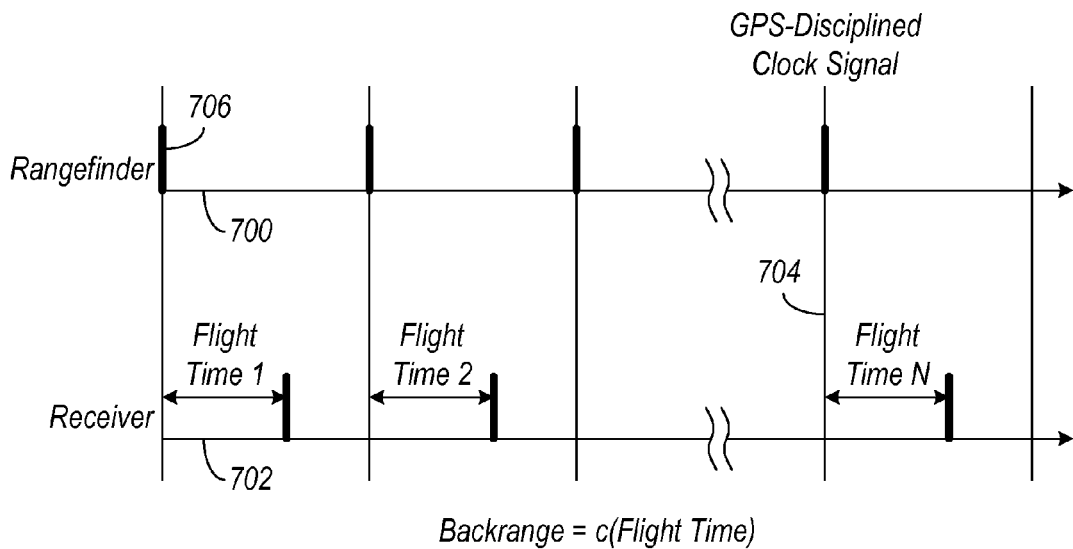
FIGS. 7A-7B illustrate exemplary timing diagrams for cooperative time of flight backrange measurements aspects of the invention.
Figure 7B:
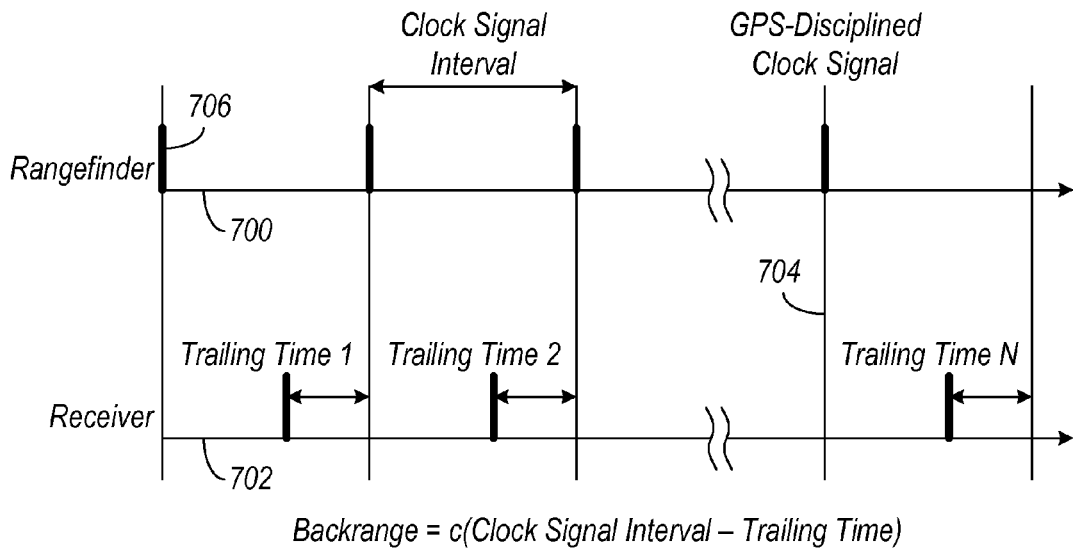

FIGS. 7A-7B illustrate exemplary timing diagrams for the above backrange measurements according to aspects of the invention. Referring first to FIG. 7A, the horizontal lines indicated at 700 and 702 are time lines for a GPS-based rangefinder and a GPS-based receiver, respectively. The long vertical lines, one of which is indicated at 704, represent the waveforms of a 10 Hz clock signals from GPS-disciplined clocks. These clock signal waveforms 704 from the GPS-disciplined clocks occur at almost exactly the same time in both timelines 700 and 702 for the reasons explained above and are therefore represented by one vertical line that spans both timelines. Laser pulses, one of which is indicated at 706, are represented by the short vertical lines. As can be seen, the clock signal waveform 704 that triggers the firing of a laser pulse 706 from the rangefinder nearly simultaneously starts a range counter at the receiver. The range counter stops counting when the laser pulse is received at the receiver. The flight time is simply the time it took for the laser pulse to travel from the rangefinder to the receiver. The backrange may then be determined by multiplying the flight time by the speed of light.

FIG. 7B illustrates an alternative implementation where the trailing time for a laser pulse is measured instead of its flight time. As can be seen in this implementation, the range counter in the GPS-based receiver starts counting when a laser pulse is received and stops counting upon occurrence of a clock signal from the GPS-disciplined clock. The trailing time is simply the time between the reception of the laser pulse and the occurrence of the clock signal waveform. The flight time may then be found by subtracting the trailing time from the clock signal waveform interval, which would be 100 microseconds for a 10 Hz clock signal, for example. An advantage of this arrangement is that the range counter begins counting only upon reception of a laser pulse instead of upon occurrence of a clock signal waveform, which may significantly reduce the duty cycle of the range counter if there are long periods between laser pulse firings.

Note in the foregoing description that if the GPS-based rangefinder 400 or the GPS-based receiver 500 is modeled after commercially available devices, they may already have an internal clock system that regulates device operation. In that case, the GPS-based timing systems 402 and 502 may be retrofitted as either a replacement for, or a supplement to, any existing internal clock systems. If deployed as a replacement, the frequencies of the clock signals from the GPS-disciplined oscillators 416 and 516 may be divided or multiplied as needed to match the frequencies of the internal clock systems. If deployed as a supplement, the GPS-disciplined clock 414 may be used to regulate the firing of the laser pulses, with other device functions continuing to be regulated by the internal clock systems.

Figure 8:
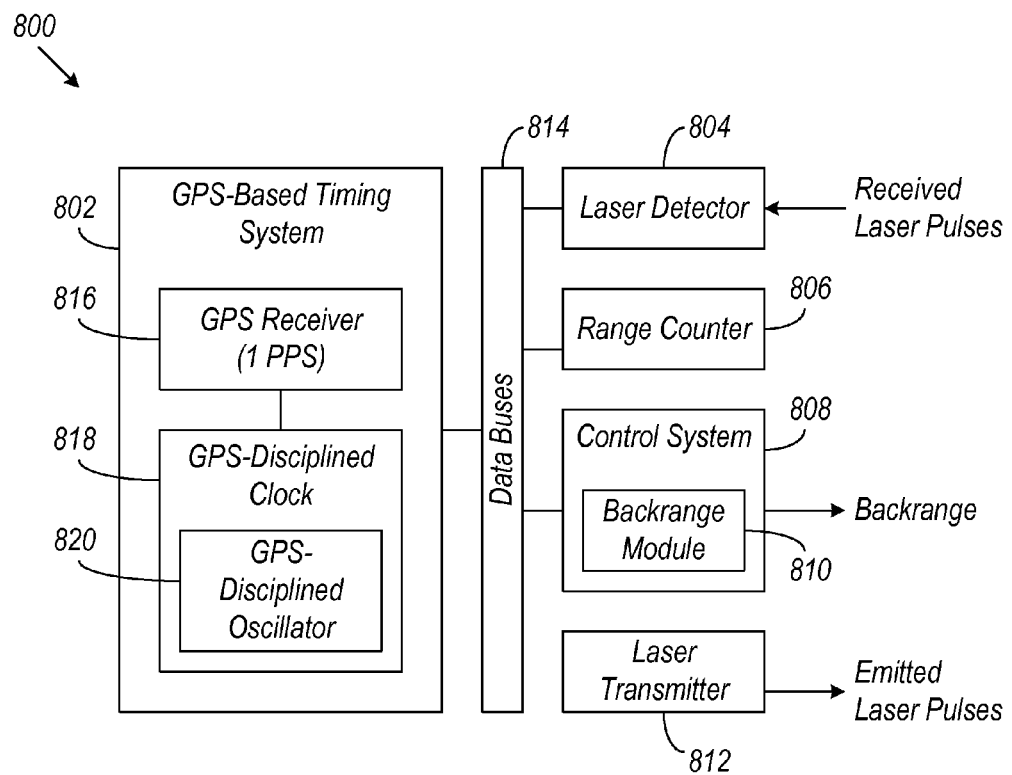
FIG. 8 illustrates a backrange finder having the rangefinder of FIG. 4 and the receiver of FIG. 5 integrated as a single unit according to aspects of the invention.

In addition, instead of separate or possibly co-located units as shown in FIGS. 4 and 5, the GPS-based rangefinder 400 and the GPS-based receiver 500 may be combined into a single integrated GPS-based backrange finder 800, illustrated in FIG. 8. As can be seen, this integrated GPS-based backrange finder 800 comprises a number of functional components, including a GPS-based timing system 802, a laser detector 804, a range counter 806, a control system 808 having a backrange module 810 therein for determining backrange measurements, and a laser transmitter 812. One or more data buses 814 may be provided to connect the various components 802-812 together as needed. In accordance with aspects of the invention, the GPS-based timing system 802 may comprise a GPS receiver 816 and a GPS-disciplined clock 818 having a GPS-disciplined oscillator 820 therein for generating clock signals that are synchronized to a GPS satellite clock. These components 802-820 of the integrated GPS-based backrange finder 800 operate in a similar manner to their counterparts in FIGS. 4 and 5 and therefore a detailed description is omitted here.

While use of GPS satellite clock signals to make cooperative backrange measurements clearly provides advantages over existing solutions, as mentioned at the outset, aspects of the invention also contemplate another way of making cooperative backrange measurements. For example, cooperative time of flight backrange measurements may be made by measuring the time of flight in both directions between a rangefinder and a receiver. This back-and-forth measurement may be made by transmitting a laser pulse from the rangefinder to the receiver to start a timer at the receiver, then using the reflection from that laser pulse to trigger a second laser pulse from the rangefinder that stops the timer. The return flight time of the start laser pulse and the forward flight time of the stop laser pulse, which together make up the inter-pulse time, may then be used to determine the distance between the rangefinder and the receiver. In some implementations, a delay of a predefined length of time may be inserted between the start laser pulse and the stop laser pulse to account for any pre-firing processing that may be needed at the rangefinder. The predefined delay may help fulfill minimize the duty cycle of the rangefinder, as well as to more precisely control the timing of the second laser pulse.

Figure 9:
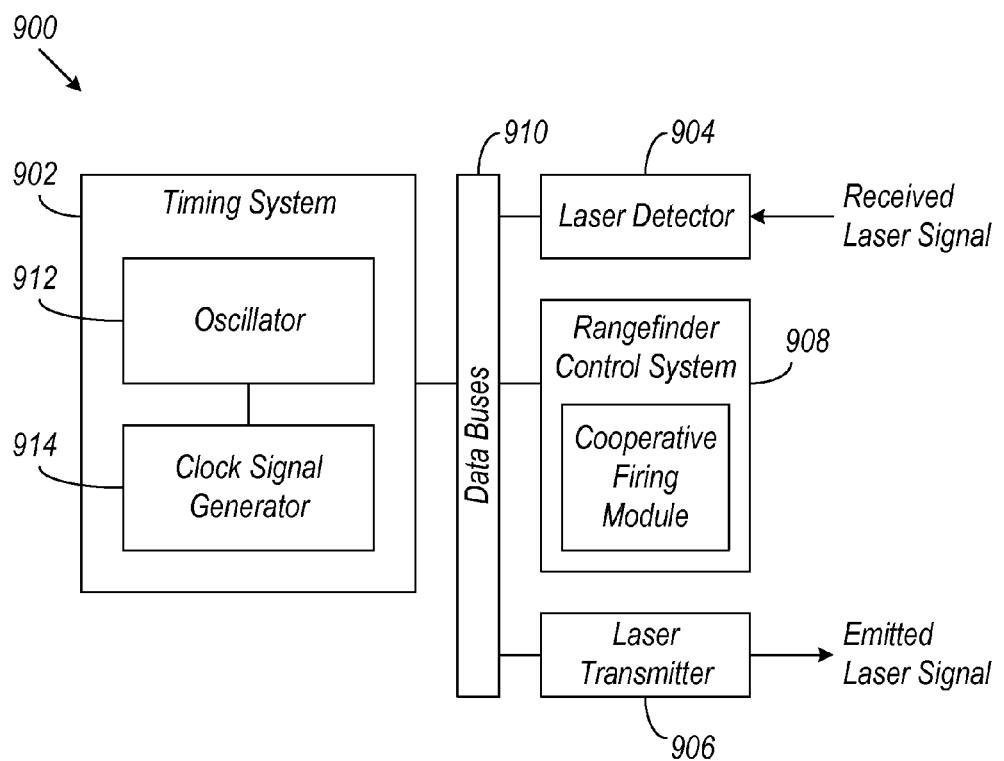
FIG. 9 illustrates a rangefinder that may be used for inter-pulse time cooperative backrange measurements according to aspects of the invention.

FIG. 9 illustrates an example of a rangefinder 900 according to aspects of the invention that may be used to make cooperative backrange estimates using the inter-pulse time technique described above. The rangefinder 900 generally resembles commercially available rangefinders except that it may be configured to use the reflection from one laser pulse to trigger the transmission of another laser pulse. As can be seen, the rangefinder 900 comprises a number of functional components, including a timing system 902, a laser detector 904, a laser transmitter 906, and a rangefinder control system 908. One or more data buses 910 may be provided to connect the various functional components 902-908 together as needed. In general, the laser detector 904 functions to detect laser pulses received by the rangefinder 900 (e.g., reflected laser pulses), the laser transmitter 906 functions to emit laser pulses, and the rangefinder control system 908 functions to control the operation of the laser detector 904 and the laser transmitter 906. The timing system 902 generates one or more clock signals that may be used to regulate the internal operation of the rangefinder 900 and, for that purpose, may include an oscillator 912 and a clock signal generator 914 connected thereto.

As mentioned above, the rangefinder 900 may be configured to fire a laser pulse, wait for the reflection from that laser pulse to return, then fire another laser pulse either immediately or after a predefined delay time. This cooperative firing sequence is in contradistinction to commercially available rangefinders that simply fire laser pulses without regard to when or even whether the fired laser pulses are returned. In some implementations, the cooperative firing sequence may be embodied in the rangefinder control system 908 in the form of a cooperative firing module 916 for some aspects of the invention. As with other modules herein, the cooperative firing module 916 may be a software module downloaded to and executed on the rangefinder control system 908, a hardware module fitted to or integrated with the rangefinder control system 908, or a combination of both software and hardware.

Figure 10:
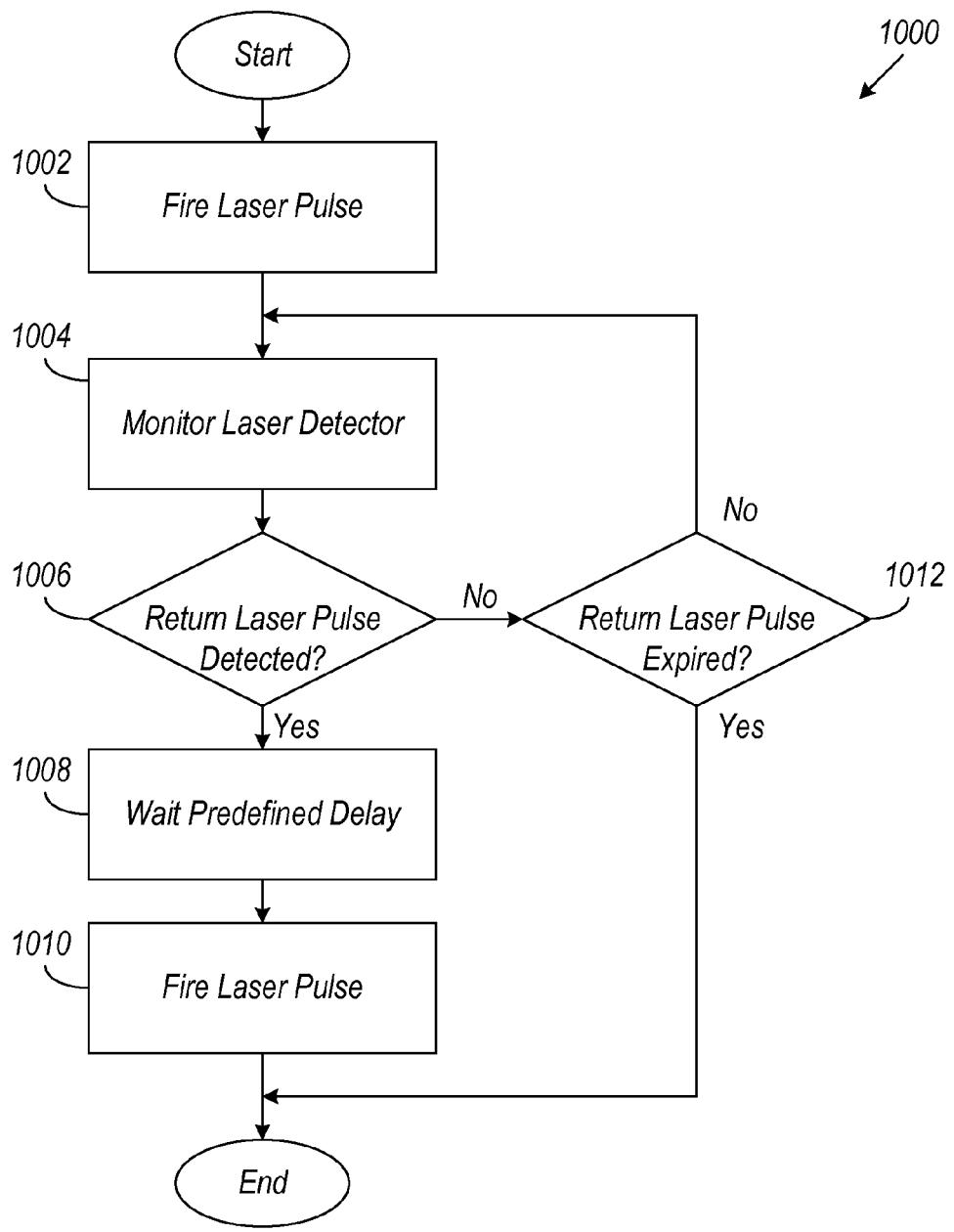
FIG. 10 illustrates a method that may be used for inter-pulse time cooperative backrange measurements according to aspects of the invention illustrated in FIG. 9.

General guidelines for operation of the cooperative firing module 916 are illustrated in the form of a flowchart 1000 in FIG. 10. As can be seen, the flowchart 1000 begins at block 1002 where a laser pulse is fired from the laser transmitter 906. This laser pulse may be fired in accordance standard triggering operation known to those having ordinary skill in the art (e.g., by sending a trigger signal from the rangefinder control system 908 to the laser transmitter 906, etc.). At block 1004, the laser detector 904 is monitored for the return of the laser pulse (e.g., after it has reflected off an intended target). At block 1006, a determination is made as to whether the return laser pulse has been detected by the laser detector 904. Detection of the return laser pulse may be accomplished using techniques commonly known to those having ordinary skill in the art, for example, by determining the modulation or encoding of the laser pulse.

If the answer at block 1006 is yes, then at block 1008, a predefined delay time (e.g., 10 µs, 20 µs, etc.) is carried out in order to give the laser transmitter 906 sufficient time to execute any initialization or pre-firing processing. This delay also helps minimize the duty cycle of the laser transmitter 906, as well as allowing more precise control of when the second laser pulse is fired. The second laser pulse is then fired from the laser transmitter 906 at block 1010.

On the other hand, if the answer at block 1006 is no, then a determination is made at block 1012 as to whether the return laser pulse may have expired based on one or more predetermined criteria (e.g., elapsed time). If the return laser pulse has not expired, then the flowchart 1000 continues with monitoring of the laser detector 904 at block 1004. If the return laser pulse has expired, then no additional laser pulses are fired, and the flowchart 1000 terminates.

Figure 11:
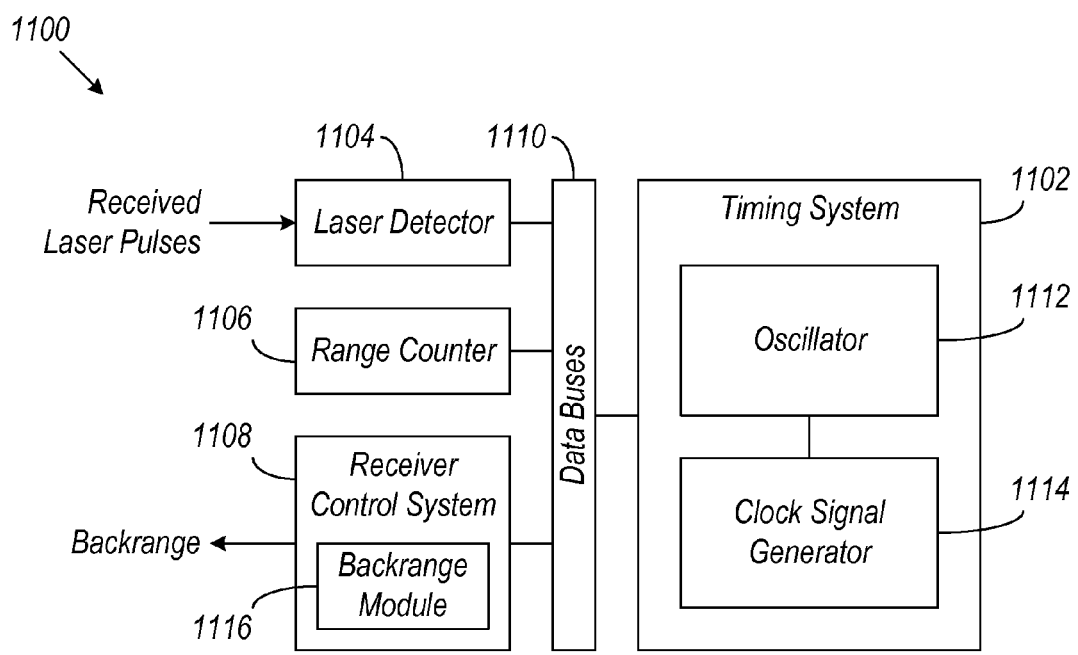
FIG. 11 illustrates a receiver that may be used for inter-pulse time cooperative backrange measurements according to aspects of the invention.

At the target end, the initial laser pulse from the laser transmitter 906 is received by a receiver 1100, an example of which is illustrated in FIG. 11. The receiver 1100 is similar to commercially available laser receivers except it is equipped with a range counter that provides a measure of the inter-pulse time described above. As can be seen, the receiver 1100 comprises a timing system 1102, a laser detector 1104, a range counter 1106, and a receiver control system 1108, among other functional components. One or more data buses 1110 may be provided to connect the various functional components 1102-1108 together as needed. The laser detector 1104 functions to detect laser pulses received by the receiver 1100, the range counter 1106 functions as a high frequency (e.g., 10 MHz, and 20 MHz, 30 MHz, 90 MHz, etc.) timer to measure the flight time back and forth between the rangefinder 900 and the receiver 1100, and the receiver control system 1108 functions to control operation of the laser detector 1104 and the range counter 1106. An oscillator 1112 and a clock signal generator 1114 may be provided in the timing system 1102 to allow the timing system 1102 to regulate the internal operation of the receiver 1100.

In accordance with aspects of the invention, the range counter 1106 may start counting upon receipt of a first laser pulse, or start laser pulse, at the laser detector 1104 from the laser transmitter 906. Preferably, the range counter 1106 is a high frequency counter, for example, 20 MHz, 30 MHz, 40 MHz, and the like, in order to provide greater accuracy. The range counter 1106 is allowed to continue counting until receipt of a second laser pulse, or stop laser pulse, from the laser transmitter 906. Note that the stop pulse should be a laser pulse from the same rangefinder 900 and not some other rangefinder. Detection of the stop laser pulse may be accomplished using techniques commonly known to those having ordinary skill in the art, for example, by discerning the modulation or encoding of the laser pulse.

If no stop pulse from the laser transmitter 906 of the same rangefinder 900 is received within a predefined amount of time, for example, 10 μs, 20 μs, 30 μs, and so forth, then the range counter 1106 simply overflows and is reset. The range counter 1106 thereafter starts counting again upon receipt of the next laser pulse from the laser transmitter 906.

Whatever count the range counter 1106 stops on when the stop pulse is received may be read or otherwise captured by the receiver control system 1108 and used as a measure of the inter-pulse time. This count may then be converted to a backrange measurement by applying the appropriate calculations. It may also be desirable in some cases to take several range counter readings (e.g., 4, 9, 13, etc.) and use either the average count, median count, maximum count, minimum count, or some other mathematical and/or statistical variation to calculate the backrange measurement.

The foregoing counting process may be implemented in the receiver control system 1108 in the form of a backrange module 1116 for some aspects of the invention. As with previous modules, this backrange module 1116 may be a software module downloaded to and executed on the receiver control system 1108, a hardware module fitted to or integrated with the receiver control system 1108, or a combination of both software and hardware. The backrange module 1116 may also be one of several smaller components making up a larger overall software program and/or hardware component on the receiver control system 1108. Such a backrange module 1116 may then be operated to measure the backrange from the rangefinder 900 to the receiver 1100 in the manner described previously.

Figure 12:
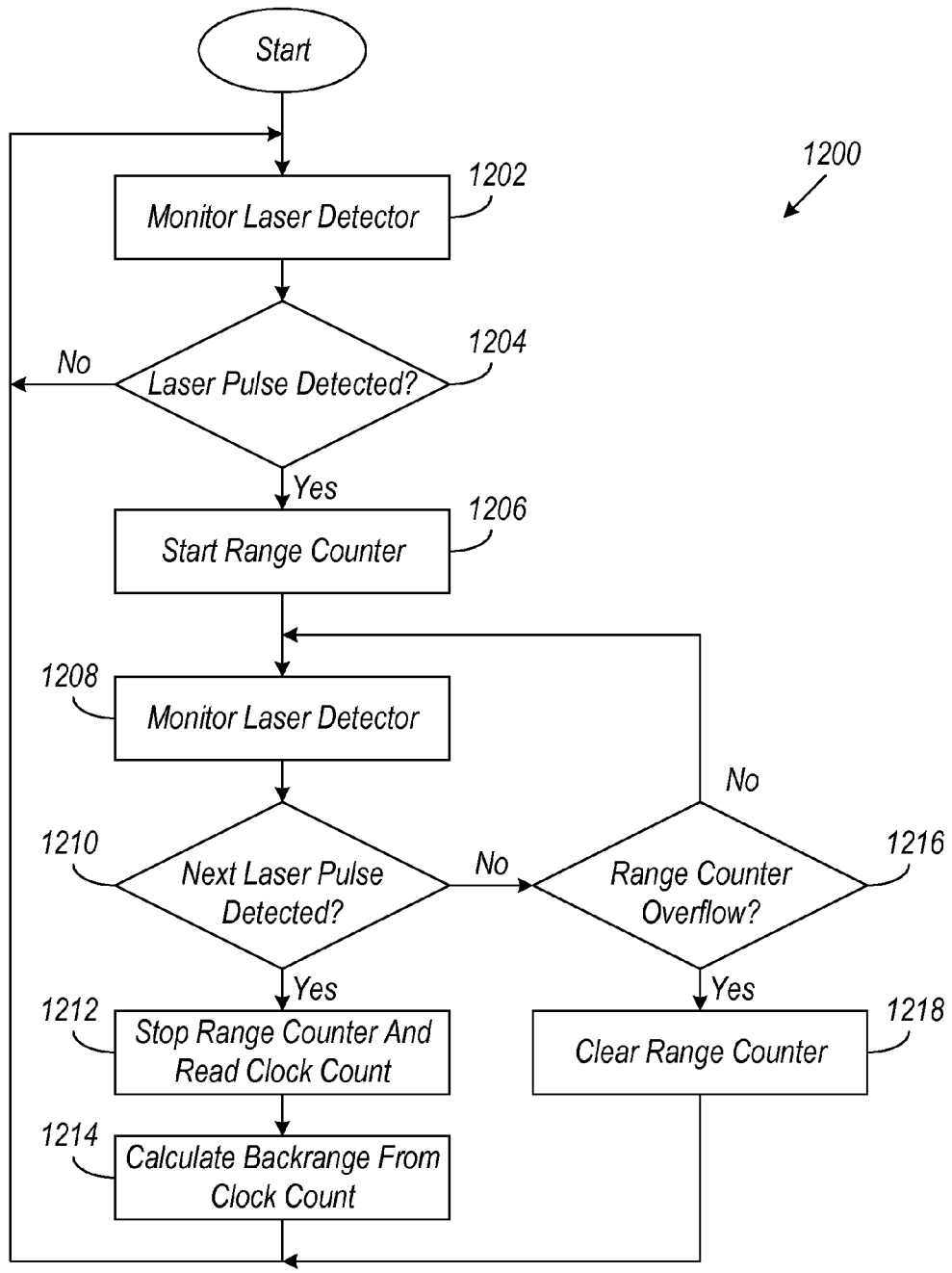
FIG. 12 illustrates a method that may be used for inter-pulse time cooperative backrange measurements according to aspects of the invention illustrated in FIG. 12.

General guidelines for operation of the backrange module 1116 are illustrated in the form of a flowchart 1200 in FIG. 12. As can be seen, the flowchart 1200 begins at block 1202 where the laser detector 1104 is monitored for receipt of a laser pulse. At block 1204, a determination is made as to whether a laser pulse has been detected. The range counter 1106 may be started at block 1206 if the answer to block 1204 is yes, or the laser detector 1104 may continue to be monitored at block 1202 if the answer to block 1204 is no. At block 1208, the laser detector At block 1208, the laser detector 1104 is monitored again for reception of another laser pulse from the laser transmitter 906 of the same rangefinder 900. A determination is made at block 1210 as to whether the next laser pulse has been detected. The range counter 1106 may be stopped and the count thereof read at block 1212 if the answer to block 1210 is yes. The count is thereafter used to calculate the backrange in a manner known to those having ordinary skill in the art at block 1214.

If no laser pulse is detected at block 1208, then a determination is made at block 1216 has to whether the range counter 1106 has overflowed. If there is no overflow, then the flowchart 1200 returns to block 1208 where monitoring of the laser detector 1104 continues. On the other hand, if there is an overflow, then the range counter 1106 is reset the flowchart 1200 returns to block 1202 where the process may be restarted.

Figure 13A:
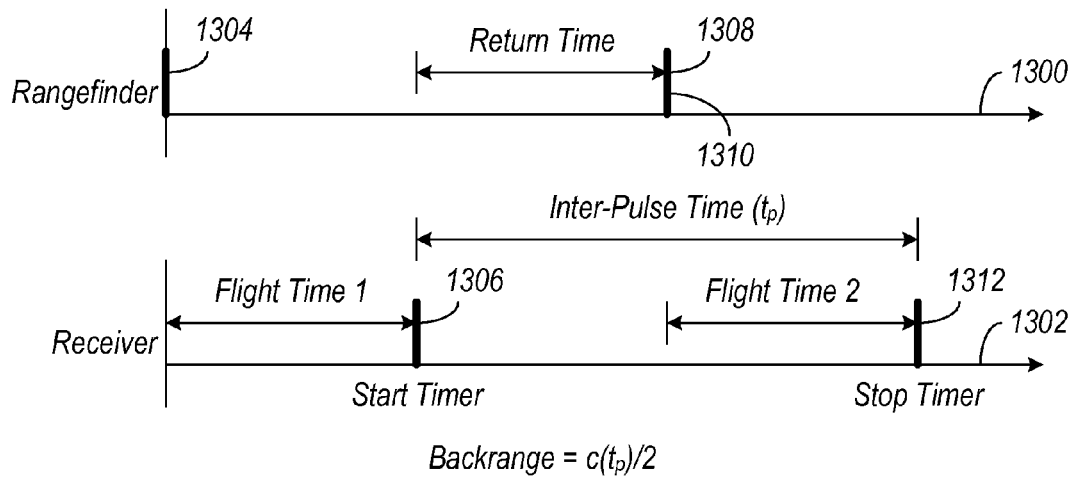
FIGS. 13A-13B illustrate exemplary timing diagrams for inter-pulse time cooperative backrange measurements according to aspects of the invention.
Figure 13B:
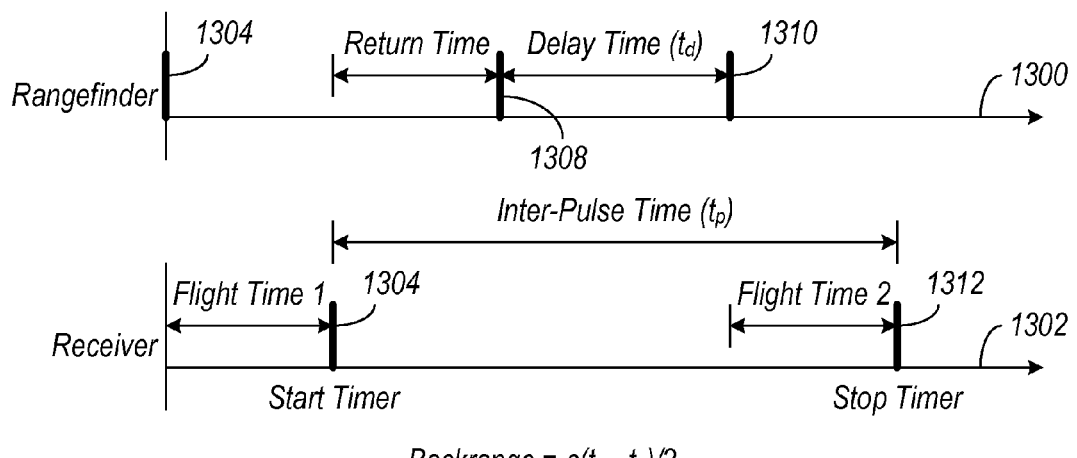

FIGS. 13A-13B illustrate exemplary timing diagrams for backrange measurements according to the inter-pulse time aspects of the invention. Referring first to FIG. 13A, the horizontal lines 1300 and 1302 are time lines for a rangefinder and a receiver, respectively. As can be seen, the cooperative backrange measurement process begins when a laser pulse 1304 is fired from a rangefinder and thereafter received by a receiver. The time it takes for the laser pulse 1304 to travel from the rangefinder to the receiver is indicated on the timing diagram as "Flight Time 1." At the receiver, the received laser pulse 1306 activates a timer and at the same time is reflected back towards the rangefinder. The time it takes for the reflected laser pulse 1308 to travel from the receiver back to the rangefinder is indicated on the timing diagram as "Return Time." Detection of the reflected laser pulse 1308 at the rangefinder triggers the firing of another laser pulse 1310 from the rangefinder to the receiver. The time it takes for this other laser pulse 1310 to travel from the rangefinder to the receiver is indicated on the timing diagram as "Flight Time 2." The duration of "Flight Time 1" is equal to the duration of "Flight Time 2" in most cases. At the receiver, the detection of the received laser pulse 1312 stops the timer. The total time measured by the timer at the receiver is therefore "Return Time" plus "Flight Time 2" and is referred to as the "Inter-Pulse Time" ($t_p$) on the timing diagram. The backrange may then be calculated by multiplying the "Inter-Pulse Time" by the speed of light and dividing by two.

In the diagram of FIG. 13A, it is assumed that the rangefinder and the receiver are sufficiently far apart that the rangefinder has enough time after firing the first laser pulse 1304 to complete any pre-firing processing such that there is no delay before firing the second laser pulse 1310 immediately upon reception of the reflected laser pulse 1308. However, in the event an initialization period is needed by the rangefinder, a preset delay time may be inserted between the reception of the reflected laser pulse 1308 and the firing of the second laser pulse 1310, as shown in FIG. 13B. Such a preset delay time, which would be known beforehand by the receiver, may help minimize the duty cycle on the rangefinder, as well as allowing more precise control of when the second laser pulse is fired. The delay time is indicated on the timing diagram of FIG. 13B as "Delay Time" ($t_d$) and may be on the order of 10 μs, 20 μs, 30 μs, and so forth. The "Inter-Pulse Time" ($t_p$) measured by the timer therefore becomes "Return Time" plus "Flight Time 2" plus "Delay Time," and the backrange is then the "Inter-Pulse Time" minus the "Delay Time" multiplied by the speed of light and divided by two.

Figure 14:
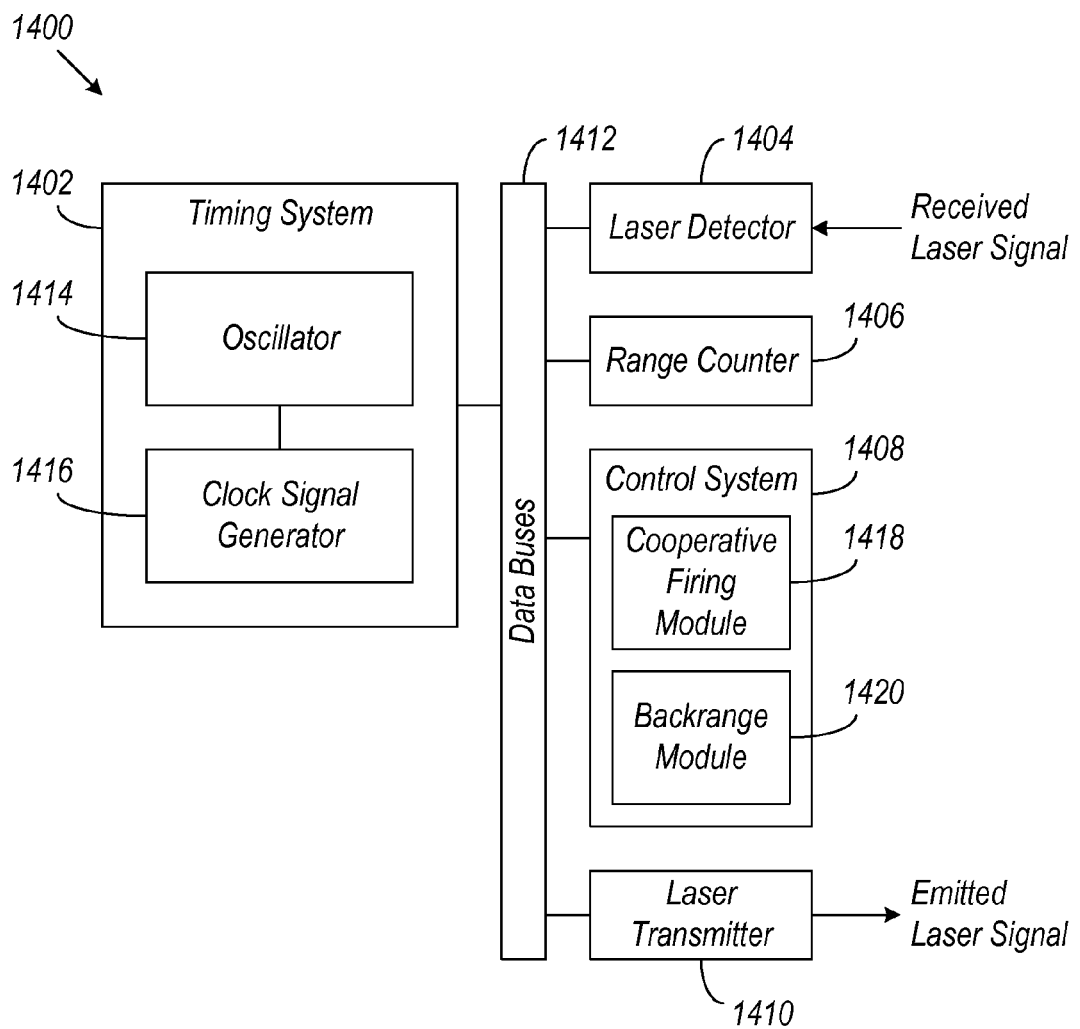
FIG. 14 illustrates a backrange finder having the rangefinder of FIG. 9 and the receiver of FIG. 11 integrated as a single unit according to aspects of the invention.

In some implementations, instead of separate or possibly co-located rangefinder 900 and receiver 1100 as shown in FIGS. 9 and 11, the rangefinder 900 and the receiver 1100 may be combined into a single integrated backrange finder 1400, illustrated in FIG. 14. As can be seen, this integrated backrange finder 1400 comprises a timing system 1402, a laser detector 1404, a range counter 1406, a control system 1408, and a laser transmitter 1410. One or more data buses 1412 may be provided to connect the various components 1402-1410 together as needed. The timing system 1402 provides the clock signals that regulate the operation of the integrated backrange finder 1400 and, to that end, may include an oscillator 1414 and a clock signal generator 1416. In accordance with aspects of the invention, the control system 1408 may comprise a cooperative firing module 1418 for controlling the timing of the laser pulses fired from the laser transmitter 1410 and a backrange module 1420 for determining backrange measurements. These components 1402-1420 of the integrated backrange finder 1400 operate in a similar manner to their counterparts in FIGS. 9 and 11 and therefore a detailed description is not necessary here.

In addition to cooperative backrange measurements, aspects of the invention also allows for more accurate marksmanship determinations, or how well a target was hit, to be obtained. These marksmanship aspects of the invention may be implemented, for example, by transmitting laser pulses that have different profiles in order to more clearly identify an intended target. The different laser profiles may be achieved by using multiple laser beams that each have a different profile, or by using a single laser beam that is capable of several different profiles, or a combination of both. The different beam profiles allow some receivers to be impinged, but not others, such that only the intended target is illuminated by every laser profile or by a required number of laser profiles. Each laser profile may have a different encoding scheme to allow the targets to distinguish the different laser profiles from one another. Marksmanship may thereafter be determined according to the number of laser profiles that illuminate a given target.

Figure 15:
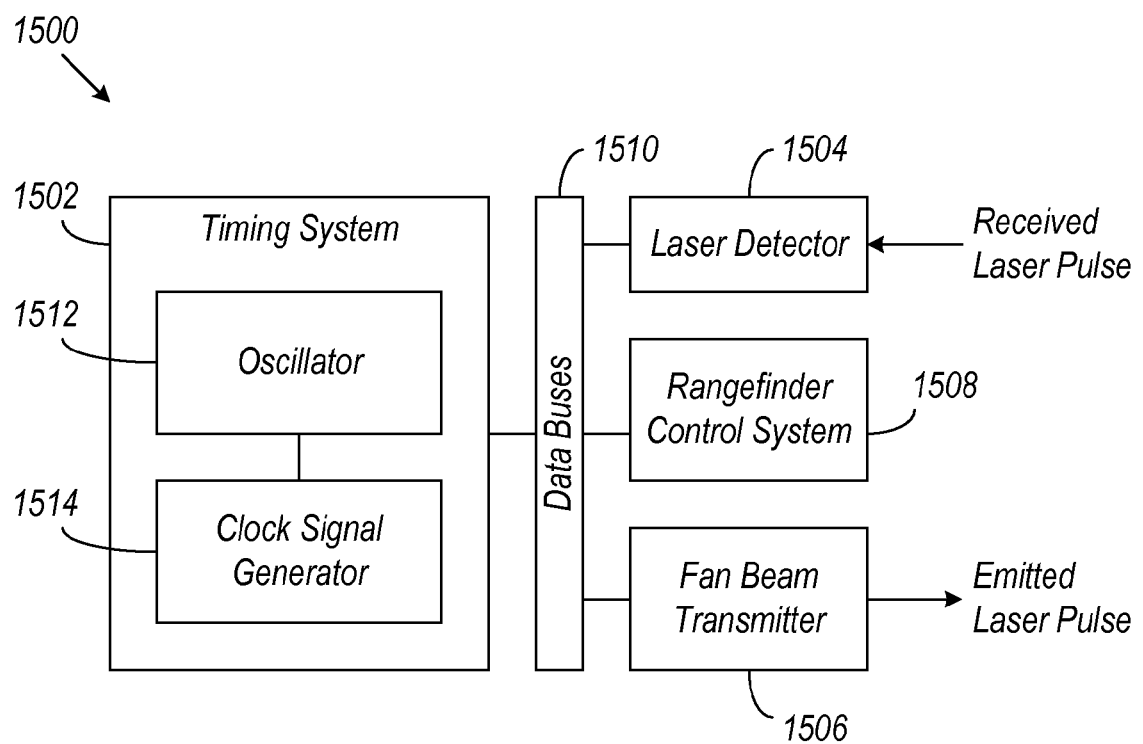
FIG. 15 illustrates a rangefinder that may be used for marksmanship determinations based on multiple laser beam profiles according to aspects of the invention.

FIG. 15 illustrates an example of a rangefinder 1500 according to aspects of the invention that uses multiple laser beam profiles to determine marksmanship. As with previous rangefinders herein, the rangefinder 1500 may be similar to commercially available rangefinders except that it may be configured with multiple laser beam profiles. As can be seen, the rangefinder 1500 comprises a number of functional components, including a timing system 1502, a laser detector 1504, a fan beam transmitter 1506, and a rangefinder control system 1508. One or more data buses 1510 may be provided to connect the various functional components 1502-1508 together as needed. An oscillator 1512 and a clock signal generator 1514 may be provided in the timing system 1502 to allow the timing system 1502 to regulate the internal operation of the rangefinder 1500.

In accordance with aspects of invention, the fan beam transmitter 1506 may be configured to emit laser pulses having multiple different beam profiles. Such a fan beam transmitter 1506 may comprise a single fan laser or it may comprise several fan lasers arrayed together. A fan laser, as understood by those having ordinary skill in the art, is a laser that is capable of outputting a fan-shaped beam. Such fan lasers are generally well known in the laser art as evidenced by, for example, U.S. Pat. No. 7,196,302 ("Laser Measuring Methods and Laser Measuring System Having Fan-Shaped Tilted Laser Beams and Three Known Points of Photodetection System") and U.S. Pat. No. 7,310,138 ("Method for Augmenting Radial Positioning System Using Single Fan Laser"), which are incorporated herein by reference. Multiple beam profiles may then be achieved for a single fan laser by adjusting and/or switching its optical components, or if multiple fan lasers are used, by selectively activating a desired fan laser from an array of fan lasers, each laser having a different beam profile.

Figure 16:
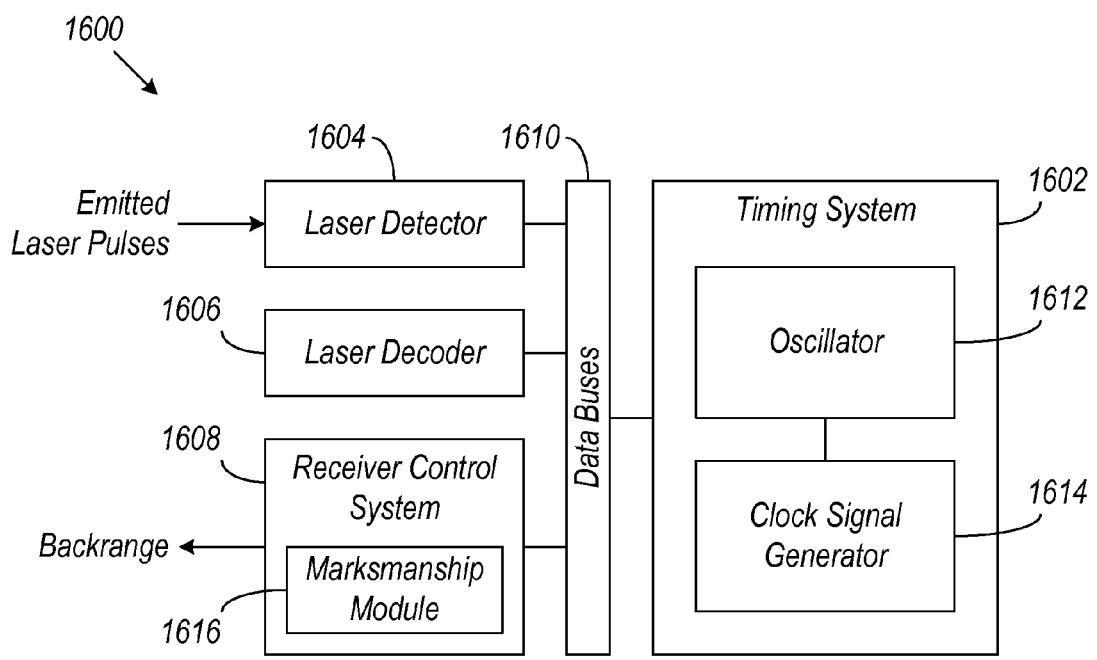
FIG. 16 illustrates a receiver that may be used for marksmanship determinations based on multiple laser beam profiles according to aspects of the invention.

The laser pulses with the different beam profiles may be received at the target by a receiver 1600, an example of which is illustrated in FIG. 16. The receiver 1600 is similar to commercially available laser receivers, except it is configured to determine whether a required number of laser beam profiles have been detected based on the different encoding carried by each beam profile. As can be seen, the receiver 1600 comprises, among other functional components, a timing system 1602, a laser detector 1604, a laser decoder 1606, and a receiver control system 1608. One or more data buses 1610 may be provided to connect the various functional components 1602-1608 together as needed. The laser detector 1604 functions to detect laser pulses received by the receiver 1600, the laser decoder 1606 functions to decode the laser pulses, and the receiver control system 1608 functions to control operation of the laser detector 1604 and the laser decoder 1606. An oscillator 1612 and a clock signal generator 1614 may be provided in the timing system 1602 to allow the timing system 1602 to regulate the internal operation of the receiver 1600.

In accordance with aspects of the invention, a marksmanship module 1616 may be provided in the receiver control system 1608 for some aspects of the invention. As with previous modules, this backrange module 1616 may be a software module downloaded to and executed on the receiver control system 1608, a hardware module fitted to or integrated with the receiver control system 1608, or a combination of both software and hardware. The marksmanship module 1616 may also be one of several smaller components making up a larger overall software program and/or hardware component on the receiver control system 1608. Such a marksmanship module 1616 may then be operated to determine the marksmanship for laser pulses received at the receiver 1600.

Figure 17:
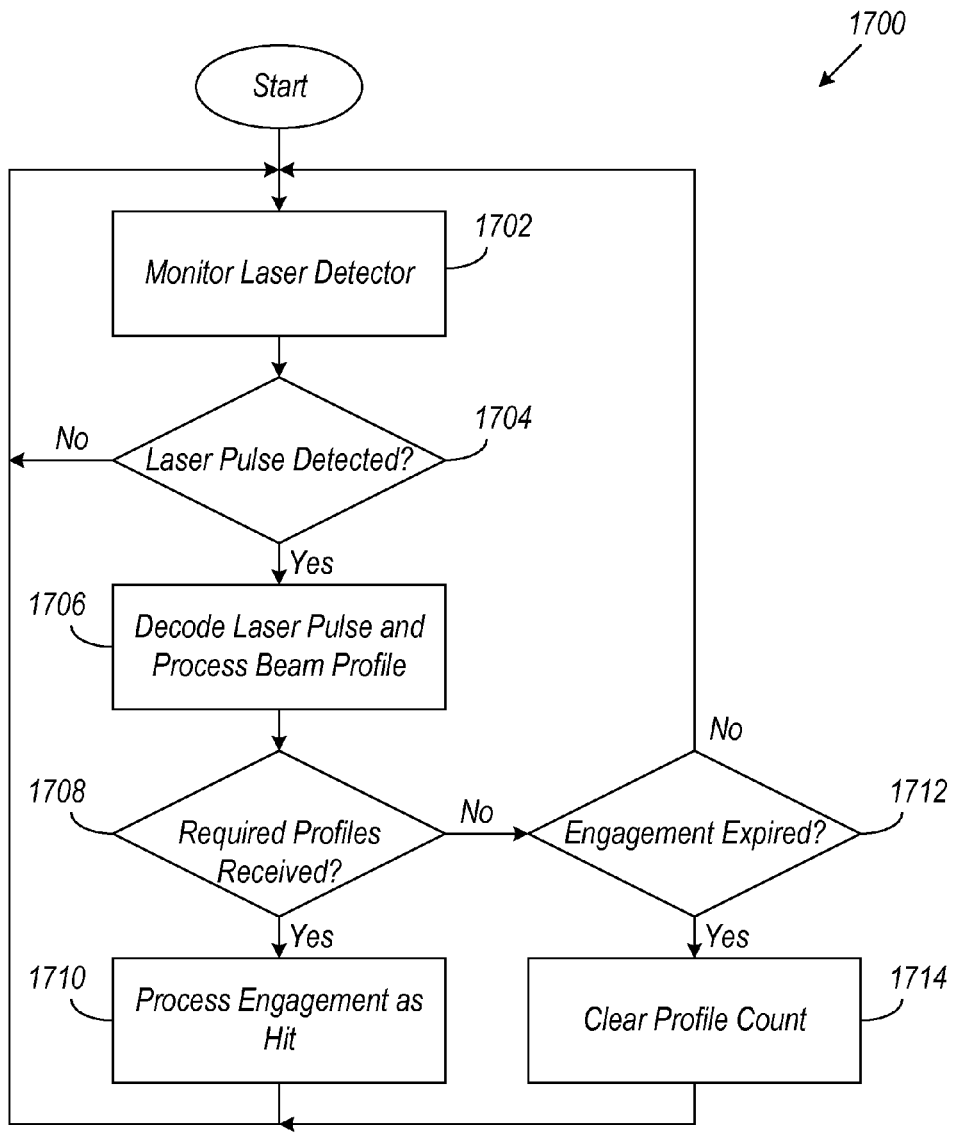
FIG. 17 illustrates a method that may be used for marksmanship determinations based on multiple laser beam profiles according to aspects of the invention.

General guidelines for operation of the marksmanship module 1616 are illustrated in the form of a flowchart 1700 in FIG. 17. As can be seen, the flowchart 1700 begins at block 1702 where the laser detector 1604 is monitored for receipt of a laser pulse. At block 1704, a determination is made as to whether a laser pulse has been detected. If the answer to block 1704 is yes, then the received laser pulse is decoded at block 1706 using decoding or demodulating techniques well known to those having ordinary skill in the art. If the answer to block 1704 is no, then the flowchart 1700 returns to block 1702 where monitoring of the laser detector 1604 may be continued.

Once the laser pulse has been decoded, a determination is made at block 1708 as to whether a predefined number of laser beam profiles have been received. For example, in an arrangement where there are four possible laser beam profiles, reception of all four beam profiles may be required (as evidenced by the encoding of the respective laser pulses) in order for a hit to be declared by the receiver 1600. Alternatively, three of the four beams, or perhaps only two of the four beams, may be sufficient in some cases for a hit to be declared by the receiver 1600, depending on the particular application.

Whatever the beam profile requirement, if the answer to block 1708 is yes, then the engagement is processed as a hit at block 1710. Such a hit may then be combined with range (or backrange) estimates to determine the level of damage or lethality suffered by the target as needed. On the other hand, if the answer to block 1708 is no, then a determination is made at block 1712 as to whether the engagement has expired based on one or more predefined criteria (e.g., elapsed time). If the engagement has not expired, then the flowchart 1700 returns to block 1702 for additional monitoring of the laser detector 1604. But if the engagement has expired, then the beam profile count is cleared at block 1714, and the process is restarted.

Figure 18A:
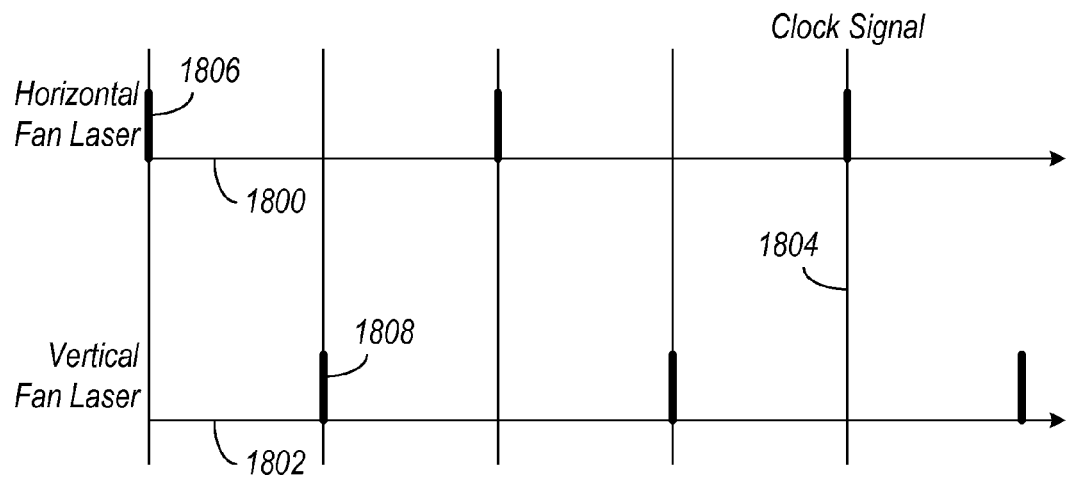
FIGS. 18A-18B illustrate a timing diagram and laser beam profiles, respectively, for marksmanship determinations based on multiple laser beam profiles according to aspects of the invention.
Figure 18B:
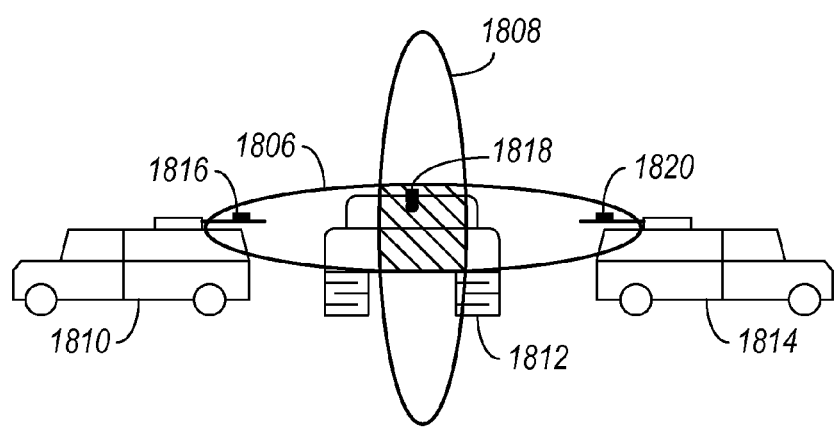

FIGS. 18A-18B illustrate an exemplary timing diagram and laser beam profiles for a marksmanship determination aspects of the invention. Referring first to FIG. 18A, the horizontal lines 1800 and 1802 are time lines for two different beam profiles in a rangefinder that is capable of emitting laser beams having multiple profiles. The vertical lines, one of which is indicated at 1804, represent internal clock signals for the rangefinder. The beam profiles in this example include a horizontally oriented beam profile and a vertically oriented beam profile. As can be seen, when the rangefinder is activated, it fires both a laser pulse 1806 having the horizontally oriented beam profile as well as a laser pulse 1808 having a vertically oriented beam profile. Each of these laser pulses 1806 and 1808 may have a different encoding or modulation scheme that allows a receiver to distinguish one laser pulse from the other laser pulse.

The beam profiles of the different laser pulses 1806 and 1808 are illustrated in FIG. 18B, where several targets 1810, 1812, and 1814 are shown in close proximity to one another in a clustered environment. Each one of the targets 1810, 1812, and 1814 is equipped with a receiver 1816, 1818, and 1820, respectively, of the type shown in FIG. 17 that is capable of making marksmanship determination based on multiple laser beam profiles. In this case, the intended target is the second target 1812. Owing to the vertical and horizontally oriented beam profiles of the laser pulses 1806 and 1808 and the different spatial areas or zones covered thereby, respectively, only the receiver 1818 for the second target 1812 receives both laser pulses 1806 and 1808. This is indicated in FIG. 18B by the overlapped or crosshatched area. As a result, it is possible to unambiguously pair the second target 1812 with the shooter of the laser pulses 1806 and 1808 despite the close proximity of the additional targets 1810 and 1814.

Figure 19A:
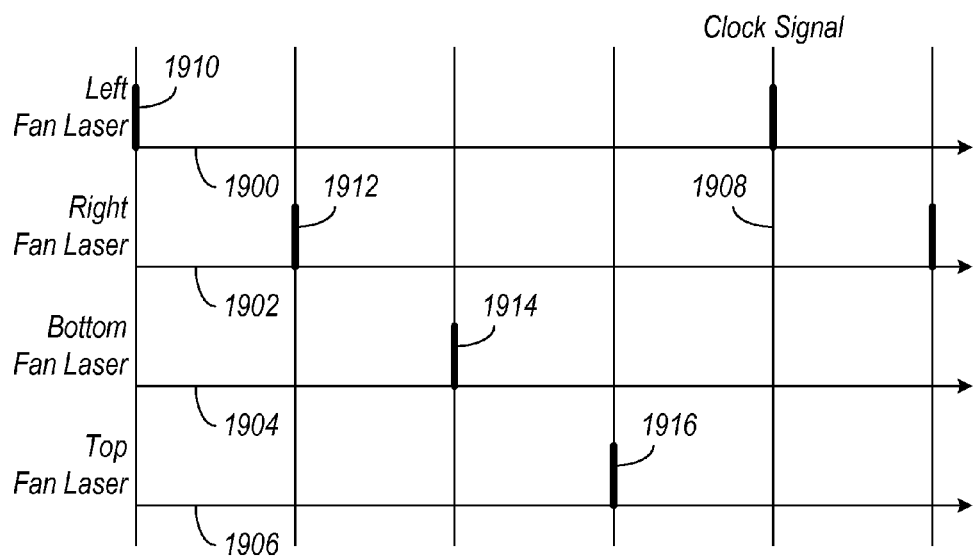
FIGS. 19A-19B illustrate another timing diagram and laser beam profiles, respectively, for marksmanship determinations based on multiple laser beam profiles according to aspects of the invention.
Figure 19B:
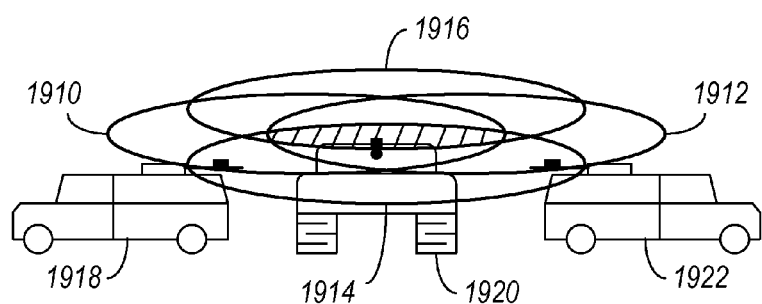

FIGS. 19A-19B are similar to FIGS. 18A-18B, respectively, except that there are now four different laser beam profiles. Referring first to FIG. 19A, the horizontal lines 1900, 1902, 1904, in 1906 are time lines for a left fan laser, right fan laser, bottom fan laser, and top fan laser, respectively. The vertical lines, one of which is indicated at 1908, represent internal rangefinder clock signals. The beam profiles in this example include a left shifted beam profile, a right shifted beam profile, a bottom shifted beam profile, and a top shifted beam profile. As can be seen, when the rangefinder is activated, it fires a laser pulse 1910 having a left shifted beam profile, a laser pulse 1912 having a right shifted beam profile, a laser beam 1914 having a bottom shifted beam profile, and a laser pulse 1916 having a top shifted beam profile. Note that the sequence with which the laser pulses 1910-1916 are fired is not important and need not be the same as the sequence described here. Each of the laser pulses 1910-1916 may have a different encoding or modulation scheme to allow a receiver to distinguish these laser pulses 1910-1916.

The beam profiles of the different laser pulses 1910-1916 are illustrated in FIG. 19B, where several targets 1918, 1920, and 1922 are shown in close proximity to one another in a clustered environment. Each one of the targets 1918, 1920, and 1922 is equipped with a receiver (not separately labeled for clarity purposes) of the type shown in FIG. 17 that can make marksmanship determination based on multiple laser beam profiles. As in the previous example, the intended target is the second target 1920. By virtue of the different beam profiles and the different spatial areas or zones covered thereby, respectively, only the second target 1920 receives all four laser pulses 1910-1916, as indicated by the overlapped or crosshatched area. This allows the second target 1920 to be unambiguously paired with the shooter despite the close proximity of the remaining targets 1918 and 1922.

Figure 20:
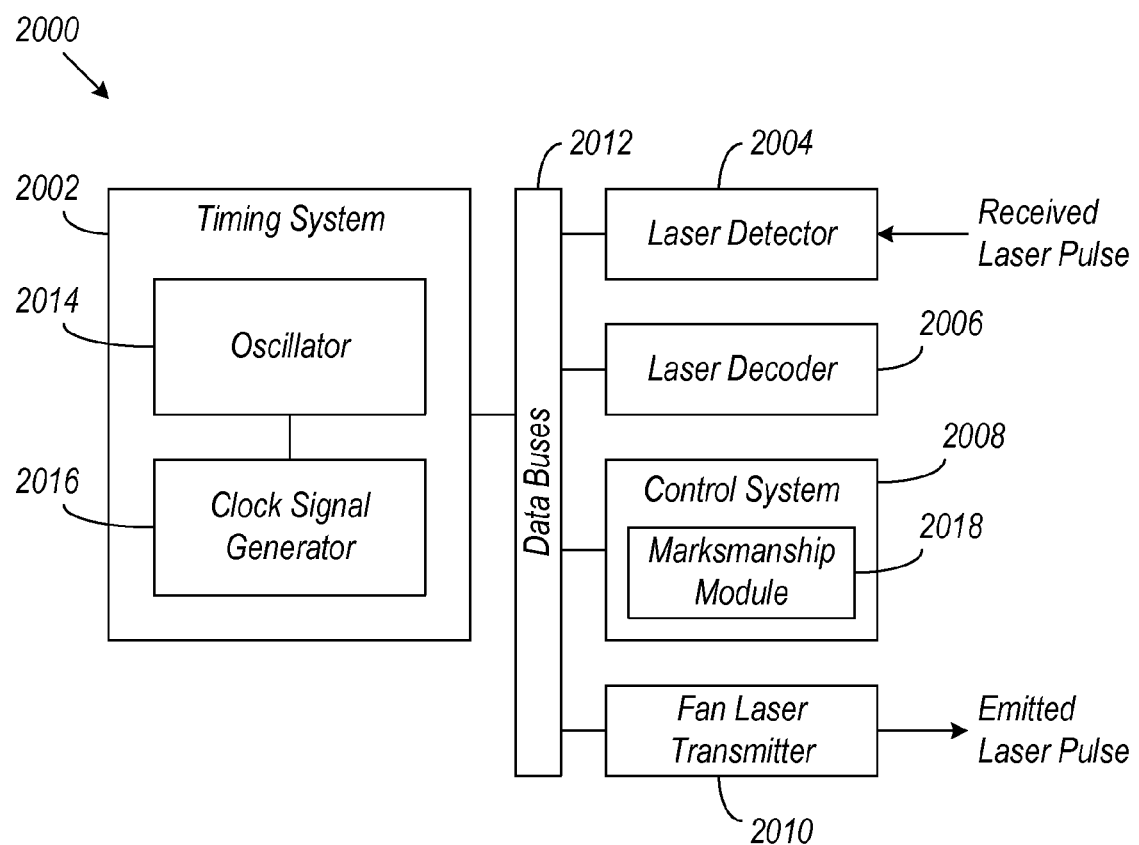
FIG. 20 illustrates a backrange finder having the rangefinder of FIG. 15 and the receiver of FIG. 16 integrated as a single unit according to aspects of the invention.

In some implementations, instead of separate or possibly co-located rangefinder 1500 and receiver 1600 as shown in FIGS. 15 and 16, the rangefinder 1500 and the receiver 1600 may be combined into a single integrated marksmanship and rangefinder unit 2000, illustrated in FIG. 20. As can be seen, this integrated marksmanship and rangefinder unit 2000 comprises a timing system 2002, a laser detector 2004, a laser decoder 2006, a control system 2008, and a fan laser transmitter 2010. One or more data buses 2012 may be provided to connect the various components 2002-2010 together as needed. The timing system 2002 provides the clock signals that regulate the operation of the integrated marksmanship and rangefinder unit 2000 and, for that purpose, may include an oscillator 2014 and a clock signal generator 2016. In accordance with aspects of the invention, the control system 2008 may include a marksmanship module 2018 for determining the marksmanship of laser pulses received by integrated marksmanship and rangefinder unit 2000. These components 2002-2018 of the integrated marksmanship and rangefinder unit 2000 operate in a similar manner to their counterparts in FIGS. 15 and 16 and therefore a detailed description is not provided here.

While the disclosed aspects of the invention have been described with reference to one or more specific implementations, those skilled in the art will recognize that many changes may be made. For example, although aspects of the invention have been described separately from one another, one or more of these aspects be combined with one or more other aspects of the invention in a single implementation. In particular, aspects of the invention that are directed to cooperative backrange measurements may be combined with aspects of the invention that are directed to marksmanship determination so as to form a single unit that is capable of both determinations. This may be accomplished, for example, by endowing the laser pulses shown in FIGS. 7A-7B and 13A-13B with different the beam profiles as described with respect to FIGS. 18A-18B and 19A-19B.

Accordingly, each of the foregoing embodiments and obvious variations thereof is contemplated as falling within the spirit and scope of the different aspects of the invention, which are set forth in the following claims.

What is claimed is:

1. A system for making laser-based cooperative time of flight backrange measurements, comprising: first laser backrange finder having a first clock signal and operable to emit a laser pulse upon occurrence of a predefined trigger event for a given engagement; and a receiver located an unspecified range from the first laser backrange finder, the receiver having a second clock signal and operable to detect the laser pulse from the first laser rangefinder, the receiver having a range counter therein and configured to start the range counter upon occurrence of a predefined start counter event and to stop the range counter upon occurrence of a predefined stop counter event;

wherein the first clock signal in the first laser backrange finder and the second clock signal in the receiver are synchronized relative to each other such that a preselected portion of a clock signal waveform of the first clock signal occurs at the same moment as either the predefined start counter event at the receiver or the predefined stop counter event at the second laser rangefinder; and wherein a count reached by the range counter of the receiver upon occurrence of the predefined stop counter event determines a backrange from the receiver to the first laser rangefinder first laser backrange finder for the given engagement.

2. The system according to claim 1, further comprising a GPS-disciplined oscillator configured to provide a clock signal that has been synchronized to a GPS clock signal.

3. The system according to claim 2, wherein the GPS-disciplined oscillator is in the first laser rangefinder first laser backrange finder and provides the first clock signal, and the predefined trigger event includes reception of the preselected portion of the clock signal waveform from the GPS-disciplined oscillator.

4. The system according to claim 2, wherein the GPS-disciplined oscillator is in the receiver and provides the second clock signal, the predefined start counter event includes reception of a preselected portion of a clock signal waveform from the GPS-disciplined oscillator, and the predefined stop counter event includes reception of the laser pulse from the first laser rangefinder.

5. The system according to claim 2, wherein the GPS-disciplined oscillator is in the receiver and provides the second clock signal, the predefined start counter event includes reception of the laser pulse from the first laser rangefinder, and the predefined stop counter event includes reception of a preselected portion of a clock signal waveform from the GPS-disciplined oscillator.

6. The system according to claim 2, wherein the GPS-disciplined oscillator is disciplined by a clock signal from one of the following: a GPS satellite, and GPS base station.

7. The system according to claim 1, wherein the laser pulse is a first laser pulse and the first laser backrange finder is configured to emit a second laser pulse if a reflection of the first laser pulse is received at the first laser rangefinder.

8. The system according to claim 7, wherein the first laser backrange finder is configured to emit the second laser pulse according to one of the following: immediately upon receipt of the reflection of the first laser pulse, and after a predefined delay time.

9. The system according to claim 8, wherein the predefined start counter event includes reception of the first laser pulse at the receiver and the predefined stop counter event includes reception of the second laser pulse at the receiver second laser rangefinder.

10. A method of making laser-based cooperative time of flight backrange measurements, comprising:
synchronizing a first clock signal in a first laser backrange finder in relation to a second clock signal in a second laser rangefinder, the receiver being located an unspecified range from the first laser rangefinder; emitting a laser pulse from the first laser backrange finder upon occurrence of a predefined trigger event for a given engagement;

detecting the emitted laser pulse at the second laser rangefinder;

starting a range counter at the receiver upon occurrence of a predefined start counter event;

stopping the range counter at the receiver upon occurrence of a predefined stop counter event; and using a count reached by the range counter upon occurrence of the predefined stop counter event to determine a backrange from the receiver to the first laser backrange finder for the given engagement;

wherein a preselected portion of a clock signal waveform of the first clock signal occurs at the same moment as either the predefined start counter event at the receiver or the predefined stop counter event at the second laser rangefinder.

11. The method according to claim 10, further comprising generating a clock signal from a GPS-disciplined oscillator, the clock signal having been synchronized to a GPS clock signal.

12. The method according to claim 11, wherein the GPS-disciplined oscillator is in the first laser backrange finder and provides the first clock signal, and the predefined trigger event includes reception of the preselected portion of the clock signal waveform from the GPS-disciplined oscillator.

13. The method according to claim 11, wherein the GPS-disciplined clock is connected to the receiver and provides the receiver clock signal, the predefined start counter event includes reception of a preselected portion of a clock signal waveform from the GPS-disciplined oscillator, and the predefined stop counter event includes reception of the laser pulse from the first laser rangefinder.

14. The method according to claim 11, wherein the GPS-disciplined oscillator is in the receiver and provides the second clock signal, the predefined start counter event includes reception of the laser pulse from the first laser rangefinder, and the predefined stop counter event includes reception of a preselected portion of a clock signal waveform from the GPS-disciplined oscillator.

15. The method according to claim 11, wherein the GPS-disciplined oscillator is disciplined by a clock signal from one of the following: a GPS satellite, and GPS base station.

16. The method according to claim 10, wherein the laser pulse is a first laser pulse and the first laser backrange finder is configured to emit a second laser pulse if a reflection of the first laser pulse is received at the at the first laser rangefinder.

17. The method according to claim 16, wherein the first laser backrange finder is configured to emit the second laser pulse according to one of the following: immediately upon receipt of the reflection of the first laser pulse, and after a predefined delay time.

18. The method according to claim 17, wherein the predefined start counter event includes reception of the first laser pulse at the receiver and the predefined stop counter event includes reception of the second laser pulse at the second laser rangefinder.

* * * * *